US012437983B2

(12) United States Patent
Booy

(10) Patent No.: US 12,437,983 B2
(45) Date of Patent: Oct. 7, 2025

(54) LID FOR USE IN A MASS SPECTROMETRY SYSTEM

(71) Applicant: DH Technologies Development PTE. LTD., Singapore (SG)

(72) Inventor: Aaron T. Booy, Barrie (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 785 days.

(21) Appl. No.: 17/640,489

(22) PCT Filed: Sep. 4, 2020

(86) PCT No.: PCT/IB2020/058225
§ 371 (c)(1),
(2) Date: Mar. 4, 2022

(87) PCT Pub. No.: WO2021/044349
PCT Pub. Date: Mar. 11, 2021

(65) Prior Publication Data

US 2022/0336201 A1 Oct. 20, 2022

Related U.S. Application Data

(60) Provisional application No. 62/896,305, filed on Sep. 5, 2019.

(51) Int. Cl.
*H01J 49/24* (2006.01)

(52) U.S. Cl.
CPC .................................... *H01J 49/24* (2013.01)

(58) Field of Classification Search
None
See application file for complete search history.

(56) References Cited

FOREIGN PATENT DOCUMENTS

| | | | | |
|---|---|---|---|---|
| EP | 2797105 A1 | * | 10/2014 | ............ H01J 49/025 |
| EP | 2797105 B1 | * | 8/2018 | ............ H01J 49/025 |
| GB | 2554626 A | * | 4/2018 | .............. H01J 49/02 |

OTHER PUBLICATIONS

International Search Report and Written Opinion of the International Searching Authority mailed May 11, 2020 in corresponding PCT App. No. PCT/IB2020/058225 (10 pages).

* cited by examiner

*Primary Examiner* — Andrew Smyth
(74) *Attorney, Agent, or Firm* — Potomac Law Group, PLLC; Reza Mollaaghababa; Brian Hairston

(57) ABSTRACT

Apparatus, systems, and methods disclosed herein utilize a lid for closing, substantially sealing, and providing an electrical interface for mass spectrometry systems. In various aspects, the present disclosure provides a lid having a plurality of layers with electrical connections therethrough. In some embodiments, lids for use in a mass spectrometry system as are disclosed herein can include a plurality of layers having electrical connections such that their inputs and outputs are laterally staggered across these layers. In some embodiments, the present disclosure provides methods of making and using disclosed lids and mass spectrometry systems. In some embodiments, implementations of the present disclosure are useful in mass spectrometry systems, including, for example, improving and simplifying assembly.

19 Claims, 22 Drawing Sheets

LID FOR USE IN A MASS SPECTROMETRY SYSTEM

RELATED APPLICATIONS

This application is the national stage of International Application No. PCT/IB2020/058225 filed on Sep. 4, 2020, which claims priority to U.S. provisional application No. 62/896,305 filed Sep. 5, 2019, the contents of which are incorporated herein in their entireties.

FIELD

The present disclosure relates to mass spectrometry systems, and more particularly to apparatus and methods for closing and/or substantially sealing mass spectrometry systems.

BACKGROUND

Mass spectrometry is an analytical technique for determining the elemental composition of test substances with both quantitative and qualitative applications. For example, mass spectrometry systems can be used to identify unknown compounds, to determine the isotopic composition of elements in a molecule, and to determine the structure of a particular compound by observing its pattern of fragmentation, as well as to quantify the amount of a particular compound in the sample.

In mass spectrometry, sample molecules are generally converted into ions using an ion source and then separated and detected by one or more mass analyzers. Ions can be generated at atmospheric pressure (e.g., by chemical ionization, electrospray) before they pass through an inlet orifice and enter an ion guide disposed in a vacuum chamber. In conventional mass spectrometry systems, a radio frequency (RF) signal applied to the ion guide provides collisional cooling and radial focusing along the central axis of the ion guide as the ions are transported into a subsequent, lower-pressure vacuum chamber in which the mass analyzer(s) are disposed.

In mass spectrometry systems, it is generally desirable, for example, to channel, focus, manipulate, and detect ions in vacuum. In particular, it is advantageous via feedthroughs to exert control over these functions and processes in a vacuum chamber. Traditional vacuum feedthroughs can present design challenges, for example, they are costly, labor intensive to install, maintain, and repair and they can require messy and undesirable solders and epoxies.

SUMMARY

The present disclosure encompasses a recognition that there is a need in a mass spectrometry system for a discrete and simple assembly for providing electrical and/or mechanical connections between an exterior of a vacuum chamber, which can be at atmospheric pressure, and an interior of the vacuum chamber.

In some embodiments, apparatus, systems as disclosed herein are useful as lids for enclosing and substantially vacuum sealing a vacuum chamber of a mass spectrometry system. In some embodiments, these lids can include apparatus for providing mechanical connection between the outside and the inside of the vacuum chamber. In some embodiments, such lids can include electrically conductive pathways that can traverse between the outside and the inside of the vacuum chamber. Methods of making and using such apparatus and systems are also provided herein. While not wishing to be bound to a particular theory, in some embodiments, lids as disclosed herein for mass spectrometry systems could be designed and configured to include all or substantially all of the electrical and mechanical feedthroughs, connections, and elements for such a mass spectrometry system.

In some embodiments, the present disclosure provides lids for a mass spectrometry system. In some embodiments, these lids can be useful for and/or configured for engaging with an opening of a vacuum chamber of the mass spectrometry system. In some embodiments, such lids can be useful for sealing the vacuum chamber. In some embodiments, one surface of the lid can be exposed to the vacuum chamber (the "vacuum surface") and an opposing surface of the lid can be exposed to the external environment (the "external surface"). In some embodiments, a lid can have a thickness in a range of about 3 mm to about 9 mm. In some embodiments, a lid can have a width in a range of about 200 mm to about 400 mm.

In some embodiments, a lid for a mass spectrometry system can include a substrate. In some embodiments, a lid for a mass spectrometry system can be fabricated from a substrate. By way of example, the substrate of the lid can include and/or can be fabricated from a plurality of layers. In some embodiments, the plurality of layers can include at least two layers. In some embodiments, the plurality of layers can include at least three layers. In some embodiments, the plurality of layers can include at least four layers. In some embodiments, the plurality of layers can include at least one electrically conductive layer. In some embodiments, the plurality of layers can include at least one electrically non-conducting layer. In some embodiments, the substrate of such a lid can include a plurality of electrically non-conductive layers. In some embodiments, the lid and/or substrate can be arranged as a printed circuit board (PCB) fabricated from a plurality of layers. In some embodiments, the at least one electrically non-conducting layer can include, for example, Rogers material, FR4, injection molded plastics, machined plastics, and/or machined composites.

In some embodiments, each layer of the plurality of layers of the substrate can include multiple surfaces. In some embodiments, when the layer is part of a lid engaged with a vacuum chamber, a surface that is adjacent or nearest to the vacuum chamber is characterized as a vacuum-side surface, and a surface that is adjacent or nearest to the atmosphere and external to the chamber is characterized as an external-side surface.

In some embodiments, the plurality of layers of the lid can be designed and arranged and then attached, bonded, or coupled to one another. In some embodiments, the plurality of layers can be attached, bonded, or coupled to one another to form the substrate of the lid. In some embodiments, the lid can include at least two layers bonded together, at least three layers bonded together, at least four layers bonded together, at least five layers bonded together, or more.

In some embodiments, the layers of a lid according to the present teachings can include a bonding material disposed therebetween. In some embodiments, the bonding material can be disposed between at least two of the layers. In some embodiments, the bonding material can laterally extend between the plurality of layers. In some embodiments, the bonding material can fully laterally extend between the plurality of layers. In some embodiments, the bonding material can uniformly extend between the plurality of layers. In some embodiments, the bonding material can extend partially between two or more of the plurality of layers. In some embodiments, the bonding material can be, for example, prepreg. As is generally known to a person of ordinary skill in the art, prepreg is a term for or that refers to pre-impregnated and can encompass all semi-cured bonding sheets that can be used to be glued and/or adhered together with heat and pressure. In some embodiments, the lid can be substantially free of any epoxies and/or solders.

In some embodiments, the lid can include at least one contact element that can be designed and configured to provide a mechanical mounting point or electrical connection point for use on, in, or through the substrate. In some embodiments, the at least one contact element can be at least partially embedded in one or more layers of the plurality of layers. In some embodiments, the at least one contact element can be accessible from the vacuum chamber. In some embodiments, the at least one contact element can be at least partially embedded in the vacuum surface of at least one of the layers and accessible to the vacuum chamber therefrom. In some embodiments, the at least one contact element can be at least partially embedded in the external surface of at least one of the layers and accessible to the atmosphere external to the chamber. In some embodiments, the at least one contact element can be accessible to an area external to the mass spectrometry system. In some embodiments, the at least one contact element can be at least partially embedded in the external surface and can be accessible to the external area therefrom.

In some embodiments, the at least one contact element can be configured as a mechanical mounting point for one or more components in the vacuum chamber or for one or more components positioned external to the vacuum chamber. In some embodiments, when the at least one contact element is configured as a mechanical mounting point for one or more components it can be configured, for example, to resist a pulling weight, to resist a pushing weight, to resist stress, to resist strain, etc. In some embodiments, the at least one contact element that can be configured as a mechanical mounting point for one or more components, can be, for example, a threaded nut, a bolt, a reusable surface mount, a fastener, a pressed fit connection, tapping into solid copper/metal blocks themselves, etc.

In some embodiments, the at least one contact element can be configured as a path, point, or trace to provide electrical power into the vacuum chamber and/or receive electrical output from the vacuum chamber. In some embodiments, when the at least one contact element includes a path, point, or trace for transmitting electrical power, the element can be configured, for example, to resist heating, dissipate heat, provide cooling, and/or actively cool the surface in and around the path, point, or trace for transmitting electrical power. In some embodiments, the at least one contact element for providing an electrical connection, can include, for example, a threaded nut, a pin contact, a clip, a pressed fit connection, spring foot, blade connector, or socket, etc. In some embodiments, a contact element that can be used as an electrical contact point can be fabricated from a solid block of electrically conductive material, for example, a metal, such as copper. In some embodiments, the solid block's top surface, for example, can be an external surface. In some embodiments, the solid block's bottom surface, for example, can be a vacuum surface. In some embodiments, such a block can be designed and configured to include center tabs that are captured and press fit within layers of the plurality of layers. In some embodiments, the solid block can include threaded holes, such that when mounted the solid block can provide direct electrical power through the lid.

In some embodiments, the lid can include electrically conductive traces that can be configured to provide an electrical connection, for example, for transmitting electrical power from one or more sources (e.g., power sources), to one or more components disposed within the vacuum chamber of the mass spectrometry system. In some embodiments, one or more electrically conductive traces can extend between the external surface and the vacuum surface of the lid. In some embodiments, for example, the one or more electrically conductive traces can be configured for providing at least one electrical connection between one or more Radio Frequency (RF) and/or Direct Current (DC) sources disposed in the external environment and one or more RF and/or DC electrically powered components of the mass spectrometry system that are disposed within the vacuum chamber. In some embodiments, the lid can include at least one electrically conductive trace. In some embodiments, the lid can include at least two electrically conductive traces. In some embodiments, for example, the lid can include one or more RF traces. In some embodiments, for example, the lid can include one or more DC traces. In some embodiments, the electrically conductive traces can have a unitary conductive structure. In some embodiments, the electrically conductive traces can have a mixed conductive structure. In some embodiments, the electrically conductive traces can be fabricated from an electrically conductive material, for example, metal (e.g., an alloy), semiconductor, resistor, capacitor, etc. In some embodiments, the electrically conductive traces can be or can include a metal, for example, the electrically conductive traces can be or can include copper, silver, gold, nickel, tin, carbon ink, etc. In some embodiments, the lids can include one or more electrically conductive traces between the plurality of layers. In some embodiments, one or more electrically conductive traces that are located between the plurality of layers can be designed and configured to be electrically isolated from one another. In some embodiments, the plurality of layers of the lid can be designed and constructed so that physically separate electrically conductive traces can be electrically isolated from one another.

In some embodiments, the one or more electrically conductive traces can be configured to initiate/terminate on the input/output surfaces of the lid, e.g., to provide input/output ports. In some embodiments, one or more electrically conductive traces are defined herein in that they extend from a proximal (external) surface to a distal (internal) surface of the lid. In some embodiments, a proximal end of each of the one or more electrically conductive traces can be disposed at the external surface and can be laterally displaced relative to a distal end thereof disposed at the vacuum surface of the lid. In some embodiments, each electrically conductive trace of the one or more electrically conductive traces can include a proximal end that can be electrically accessible external to a vacuum chamber to which the lid is coupled and a distal end that can be electrically accessible inside the vacuum chamber. The proximal end can be exposed to the external environment, which can be maintained, for example, at atmospheric pressure. In some embodiments, the proximal end can be accessible by an electrical lead and/or connection. The distal end can be exposed to vacuum of the vacuum chamber. In some embodiments, the distal end can be accessible by an electrical lead and/or connection. In some embodiments, a proximal end of an electrically conductive trace is laterally displaced relative to a distal end. By way of example, such as a lateral displacement can vary between about 10 mm to 300 mm.

In some embodiments, the lid can include one or more channels and/or vias that are configured to extend into at least one layer of the plurality of layers of the lid for providing at least one point of electrical access and/or at least one point of mechanical access. For example, one or more mechanical contact elements and/or electrical contact elements, e.g., electrical traces, can be disposed at least partially in the one or more channels and/or vias. In some embodiments, the lid includes one or more channels and/or vias extending into at least one layer of the plurality of layers for providing a point of electrical access and/or a point of mechanical access on a surface of the lid. In some embodiments, the lid can include one or more channels and/or vias in one or more locations in or on the lid. In some embodiments, the one or more channels and/or vias can be laterally dispersed on the surface of the lid. In some embodiments, the one or more channels and/or vias can extend into at least one layer of the plurality of layers to expose the one or more electrically conductive traces and/or the at least one mechanical contact. In some embodiments, one or more channels and/or vias can extend into at least one layer at the proximal and/or distal ends of the one or more electrically conductive traces so that the traces are accessible to the external environment and/or the vacuum chamber. In some embodiments, for example, the one or more channels and/or vias that extend into the at least one layer at the proximal and/or distal ends can be filled, for example with a conductive epoxy that contacts the one or more electrically conductive traces, so that the traces are accessible to the external environment and/or the vacuum chamber.

In some embodiments, the lid can include a capacitor. In some embodiments, the capacitor can include at least two electrically conductive materials, one extending from the vacuum surface, another from the external surface, separated by the substrate. In some embodiments, at least two materials are separated by a dielectric, such that it forms a circuit that exhibits capacitance. In some embodiments, the capacitor can include at least two electrically conductive traces extending between the external surface and the vacuum surface. In some embodiments, the lid can include the at least two electrically conductive traces that can provide at least one electrical connection having a dielectric material in between the at least two electrically conductive traces. In some embodiments, the dielectric material can include the substrate layer. In some embodiments, the at least two electrically conductive traces having the dielectric material between them can provide a built-in capacitance to the lid. In some embodiments, one or more channels and/or vias can extend into the layers at the proximal and/or distal ends. In some embodiments, the proximal and/or distal ends of the electrical traces are accessible by or through the one or more channels and/or vias. In some embodiments, for example, the one or more channels and/or vias that extend into the at least one layer at the proximal and/or distal ends can be filled, for example with a conductive epoxy that contacts the one or more electrically conductive traces, so that the traces are accessible to the external environment and/or the vacuum chamber.

In some embodiments, the contact elements, channels, etc., on and/or embedded in at least one layer of the plurality of layers can be vented such that they can outgas when exposed to vacuum. In some embodiments, for example, at least two layers of the lid can include at least one contact element that is mounted thereto. In some embodiments, when that contact element is partially exposed on the vacuum surface of the substrate, the surrounding layers form a cavity that can provide venting access to the vacuum chamber, so that these elements can freely outgas under vacuum, e.g., high vacuum conditions.

In some embodiments, the lid can include one or more support rails to mount components and/or provide supplemental stability to the substrate. In some embodiments, the lid can include one or more support rails located on or disposed on the vacuum surface and/or the external surface of the substrate. In some embodiments, the one or more support rails can be attached to or coupled to the substrate. In some embodiments, the one or more support rails can be configured for mounting one or more components. In some embodiments, the one or more components can be disposed in the vacuum chamber or on the lid external to the vacuum chamber. In some embodiments, the one or more support rails are configured to mount one or more components in vacuum, including, for example, an ion lens. In some embodiments, for example, the mass spectrometry system can include ion optics for a quadrupole ion guide mounted to the one or more support rails disposed on vacuum surface of the lid's substrate. In some embodiments, the one or more support rails can be attached or coupled to the external surface of the lid's substrate. In some embodiments, the one or more support rails are configured to mount one or more components, including, for example, an RF coil box mounted on the external surface of the lid's substrate. In some embodiments, the lid can further include RF components mounted on the RF coil box. In some embodiments, the RF components can include, for example, RF chokes, coupling capacitors, and/or resistors. In some embodiments, the support rail can be fabricated from a metal. In some embodiments, the metal support rails can include, for example, copper, steel, etc.

In some embodiments, the lid can be configured to seal a vacuum chamber of a mass spectrometry system. In some embodiments, the lid can include a sealing surface. In some embodiments, the sealing surface can be useful for sealingly engaging the lid with the vacuum chamber of the mass spectrometry system. In some embodiments, the sealing surface can be configured for sealing with an O-ring. In some embodiments, the sealing surface, for example, can be a metal, polished metal, plated metal, copper, etc. In some embodiments, the sealing surface can include a knife edge. In some embodiments, the lid and the vacuum chamber further include an O-ring or metal (e.g. Cu or plated Cu) gasket for sealingly attaching or sealingly coupling the lid to the vacuum chamber. In some embodiments, the lid can be a hinged lid, for example, it can include a hinge to attach the lid to the vacuum chamber.

In some embodiments, the lid can enclose and/or seal one or more of the electronic components of the mass spectrometry system (e.g. the ion guides) disposed within a vacuum chamber. In some embodiments, the lid can be sealingly attached or sealingly coupled to the vacuum chamber. In some embodiments, the lid can substantially seal the vacuum chamber. In some embodiments, when the lid seals the vacuum chamber it can be substantially free of leaks and/or outgas sing. In some embodiments, when the lid is sealingly attached or sealingly coupled to the opening of the vacuum chamber and a vacuum is pulled, a differential pressure can form or exist between an atmospheric region and an inside of the vacuum chamber. In some embodiments, the lid is configured to withstand a differential pressure of at least about 1.5 atm or about 22.5 PSI when sealingly coupled to the vacuum chamber. In some embodiments, when the lid is sealingly attached or sealingly coupled to the vacuum chamber and a differential pressure exists between the atmospheric and the vacuum surfaces of the lid, the vacuum chamber can maintain an operating pressure down to about $1\times10^{-8}$ Torr.

In some embodiments, the lid can be mechanically robust enough to support a variety of vacuum and/or external components. In some embodiments, the thickness and materials used to fabricate the lid can be such that components can be supported by the lid, for example, ion optics, coils boxes, etc. and such that the lid does not exhibit any evidence of bending, cracking, damage, and/or stress from assembly or when operating at a pressure down to about $1\times10^{-8}$ torr. In some embodiments, the lid can be configured such that when vacuum and/or when external components are mounted thereto, the lid is free of armatures and cabling. In some embodiments, the lid can be substantially free of any drill holes, thru holes, and/or vacuum patches. In some embodiments, the lid can be substantially free of any epoxies and/or solders.

The foregoing and other advantages, aspects, embodiments, features, and objects of the present disclosure will become more apparent and better understood by referring to the following detailed description when read in connection with the accompanying drawing.

BRIEF DESCRIPTION OF THE DRAWING

A person of ordinary skill in the art will understand that the drawing, described below, is for illustration purposes only. The drawings are not intended to limit the scope of the Applicant's teachings in any way. It is emphasized that, according to common practice, various features of the drawing are not necessarily to scale. On the contrary, the dimensions of the various features are or may be arbitrarily expanded or reduced for clarity. Included in the drawing are the following FIGS..

DEFINITIONS

Figure 1:
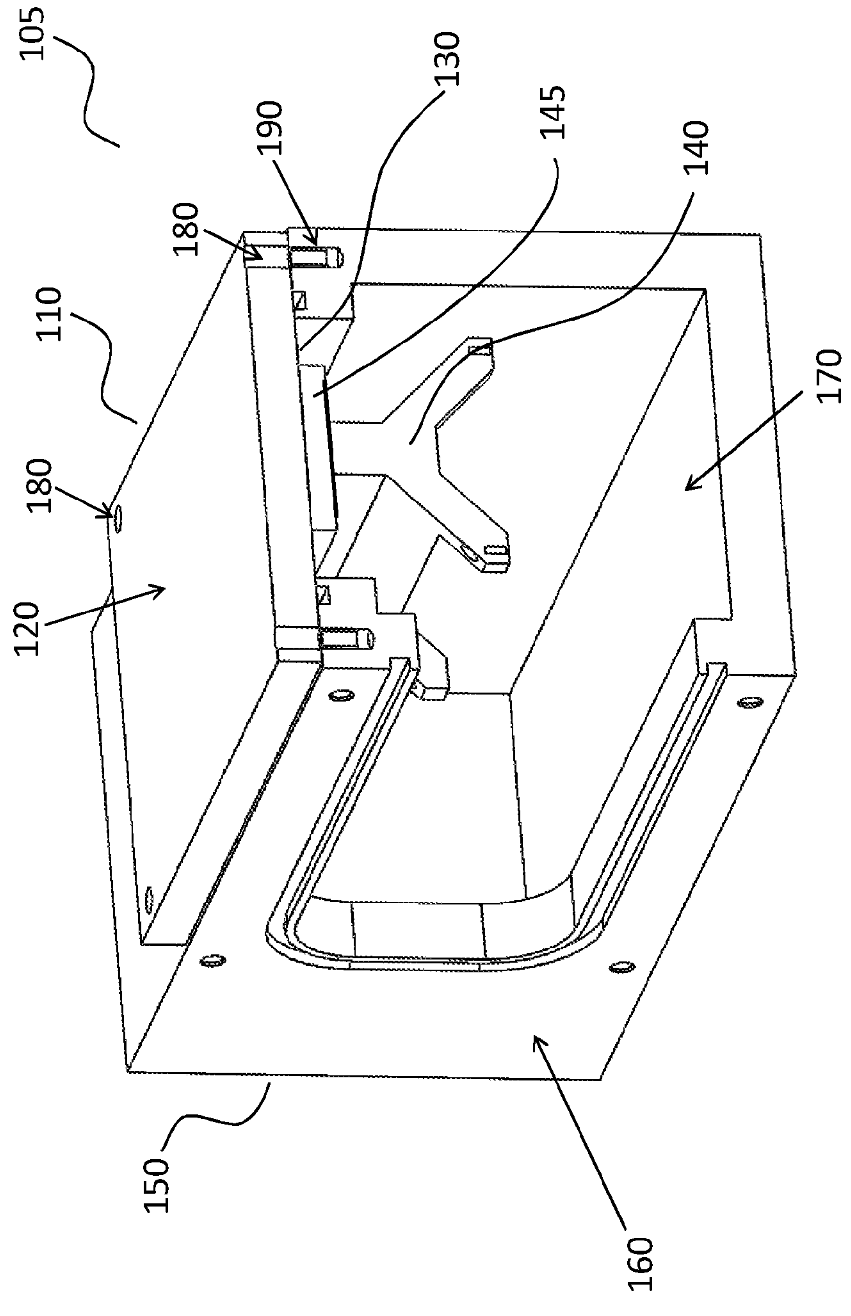
FIG. 1, in a schematic diagram, illustrates a lid of a mass spectrometry system mounted to a vacuum chamber in accordance with one aspect of various embodiments of the present disclosure.

Various terms relating to aspects of the present disclosure are used throughout the specification and claims. Such terms are to be given their ordinary meanings in the art, unless otherwise indicated. In order for the present disclosure to be more readily understood, certain terms are first defined below. Additional definitions for the following terms and other terms are set forth throughout the specification.

As used herein, the terms "about," "approximately," and "substantially" refer to variations in a numerical quantity that can occur, for example, through measuring or handling procedures in the real world; through inadvertent error in these procedures; through differences/faults in the manufacture of electrical elements; through electrical losses; as well as variations that would be recognized by a person of ordinary skill in the art as being equivalent so long as such variations do not encompass known values practiced by the prior art. Whether or not modified by the term "about", "approximately", or "substantially", quantitative values recited in the claims include equivalents to the recited values, e.g., variations in the numerical quantity of such values that can occur, but would be recognized to be equivalents by a person skilled in the art.

As used herein, unless otherwise clear from context, the term "a" may be understood to mean "at least one." As used in this application, the term "or" may be understood to mean "and/or." In this application, the terms "comprising" and "including" may be understood to encompass itemized components or steps whether presented by themselves or together with one or more additional components or steps. Unless otherwise stated, the terms "about" and "approximately" may be understood to permit standard variation as would be understood by those of ordinary skill in the art. Where ranges are provided herein, the endpoints are included. As used in this application, the term "comprise" and variations of the term, such as "comprising" and "comprises," are not intended to exclude other additives, components, integers or steps.

As used herein, the terms "about" and "approximately" are used as equivalents. Any numerals used in this application with or without about/approximately are meant to cover any normal fluctuations appreciated by one of ordinary skill in the relevant art. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). For example, if the term "about" means greater or lesser than the value or range of values stated by 1/10 of the stated value, e.g., ±10%, then applying a voltage of about +3V DC to an element can mean a voltage between +2.7V DC and +3.3V DC.

As used herein, the term "substantially" refers to a qualitative condition of exhibiting total or near-total extent or degree of a characteristic or property of interest. One of ordinary skill in the art will understand that electrical properties rarely, if ever, go to completion and/or proceed to completeness or achieve or avoid an absolute result. Substantially is therefore used herein to capture a potential lack of completeness inherent therein. Values may differ in a range of values within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than). For example, values may differ by 5%.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The following detailed description of embodiments is not to be regarded as limiting the scope of the applicant's teachings in any manner.

In some embodiments, implementations of the present disclosure are useful in mass spectrometry systems, including, for example, improving and simplifying assembly of various components with a vacuum chamber of the mass spectrometry system. The present disclosure encompasses a recognition that in mass spectrometry systems, it is desirable for example to channel, focus, and/or manipulate ions in vacuum. In particular, present disclosure encompasses a recognition that it is advantageous via feedthroughs to electrically power and control mass spectrometry systems that channel, focus, and/or manipulate ions in vacuum from outside the vacuum chamber. Traditional vacuum feedthroughs can present design challenges; they are costly, and labor intensive to design install, use, maintain, and repair. Traditional vacuum feedthroughs often require messy and undesirable solders and epoxies to seal drill holes created in the vacuum surfaces to plumb mechanical and electrical inputs and outputs. The present disclosure further encompasses a recognition that there is a need for a discrete, simple, low weight/mass, high strength/durability lid assembly that can be used to introduce such connections, which feed electrical power from the outside to the inside of a vacuum chamber and which provide element for mechanical contacts and feedthroughs.

In some embodiments, apparatus, systems and methods of the present disclosure include lids that are capable of absorbing much of the electrical, vacuum, and mechanical complexity, weight, and cost of current mass spectrometry systems. In some embodiments, electrical, mechanical, and vacuum configurations, designs, elements, and features disclosed herein can be useful to reduce these burdens. For example, in some embodiments, printed circuit board (PCB) technologies can be employed to fabricate lids according to the present teachings. Such lids can greatly reduce the cost and complexity associated with feedthroughs, their assembly and maintenance. An aim exemplified by the present disclosure is to combine structural and functional elements of mass spectrometry systems in a way such that one part can do the function of many.

Among other things, the present disclosure provides apparatus and systems useful as lids for enclosing and/or substantially sealing a vacuum chamber. In particular, the lids provide for sealing of a vacuum chamber of a mass spectrometry system. In some embodiments, lids useful in sealing a mass spectrometry system as provided herein can include a substrate to substantially seal an inside of a vacuum chamber of a mass spectrometry system from an outside area and/or an external region of the vacuum chamber, for example an area or region that is maintained at or near atmospheric pressure. In some embodiments, lids useful in sealing a mass spectrometry system as provided herein can include electrical and/or mechanical contact elements, electrically conductive traces, and/or channels, which can extend, for example from an external surface of the lid to a vacuum surface of the lid. In some embodiments, contact elements, electrically conductive traces, channels, as provided herein, for example, can be configured such that they are laterally displaced on a lid, pressed fit in a lid, such that lids can be useful in sealing a mass spectrometry system as provided herein. In some embodiments, lids are substantially free of solder and epoxy. In some embodiments, contact elements, electrically conductive traces, channels, of lids useful in sealing a mass spectrometry system as provided herein can be substantially free of solders and epoxies. In some embodiments, the present teachings provide methods of making and using these lids with mass spectrometry systems.

The present disclosure provides teachings for a lid for use in a mass spectrometry system. In some embodiments, the lid can be fabricated from a substrate that includes a plurality of layers, which can be attached, bonded, connected, and/or coupled to one another. In some embodiments, the substrate can be configured for engaging with an opening of a vacuum chamber of a mass spectrometry system to seal the chamber from an external environment. In some embodiments, when engaged with the opening of the vacuum chamber of the mass spectrometry system, the substrate can seal the vacuum chamber from an external environment. In some embodiments, the lid can have one surface exposed to the vacuum chamber, that is a vacuum surface, and an opposing surface that is exposed to the external environment, that is an external surface. In some embodiments, the lid can include one or more electrically conductive traces extending between the external surface and the vacuum surface. In some embodiments, for example, the electrically conductive traces can be configured to provide electrical connections between one or more RF and/or DC sources disposed in the external environment and one or more components of the mass spectrometry system that are disposed within the vacuum chamber. In some embodiments, the one or more electrically conductive traces can have a proximal end disposed at the external surface and a distal end disposed at the vacuum surface of the substrate. In some embodiments, the proximal end is electrically accessible to the external environment. In some embodiments, the distal end is electrically accessible to the vacuum chamber. In some embodiments, the proximal and distal ends can be laterally displaced relative to one another within the substrate. In some embodiments, the lid can include one or more contact elements for facilitating electrical and/or mechanical connections. In some embodiments, the lid can include one or more channels and/or vias so that the electrical and/or mechanical connections and/or the electrically conductive traces are accessible.

Lids for Use with a Mass Spectrometry System

With reference to FIGS. 1-8, a lid 110 for use in a mass spectrometry system is disclosed. While apparatus, systems, and methods as disclosed herein can be used in conjunction with many different mass spectrometry systems, an exemplary mass spectrometry system, a quadrupole is used throughout to teach various aspects and embodiments. However, it should specifically be understood that other mass spectrometry systems having other configurations can be used in accordance with the apparatus, systems, and methods as disclosed in this application.

Figure 2:
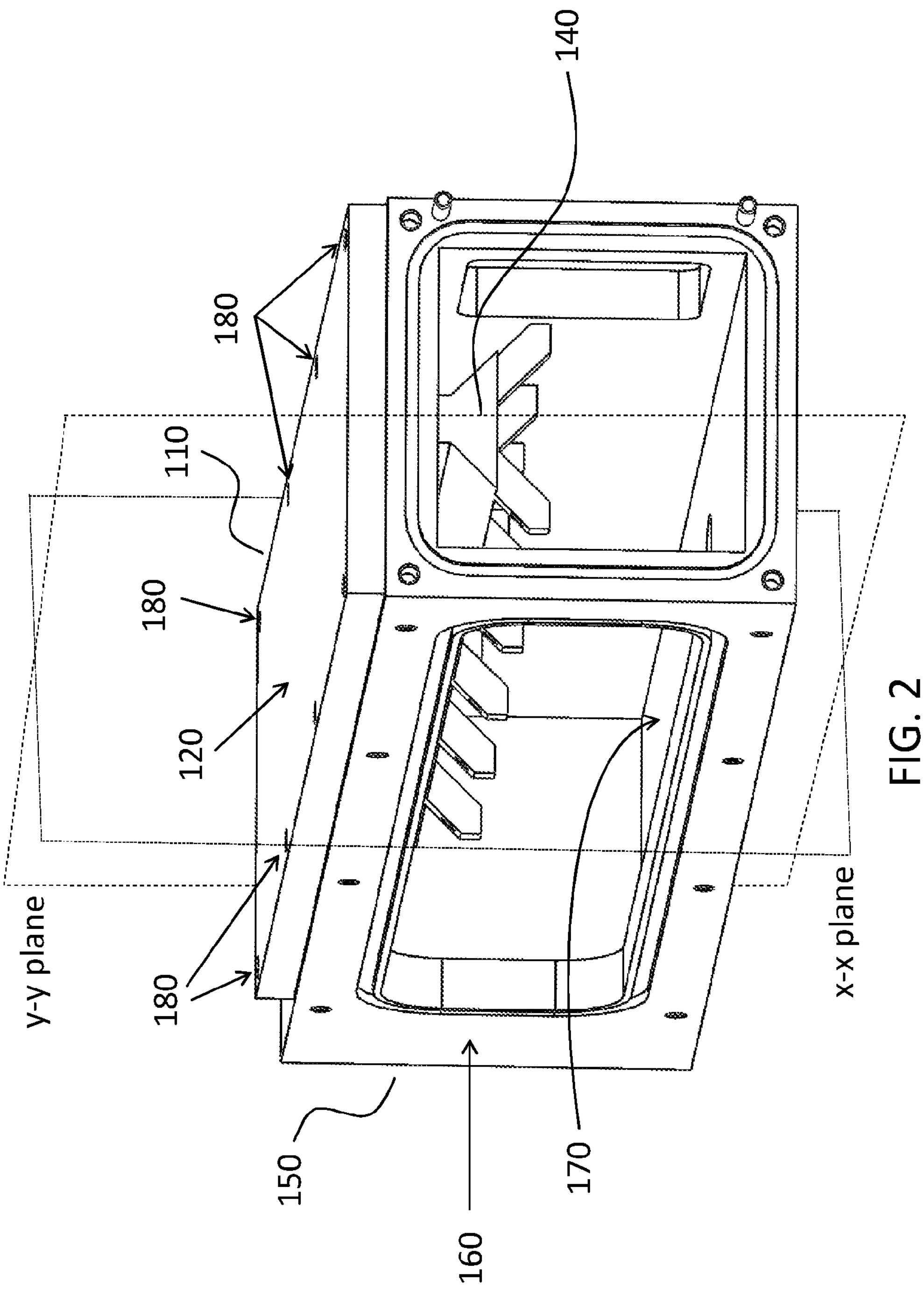
FIG. 2, in a schematic diagram, illustrates another view and/or perspective of a lid of a mass spectrometry system mounted to a vacuum chamber in accordance with one aspect of various embodiments of the present disclosure.
Figure 3:
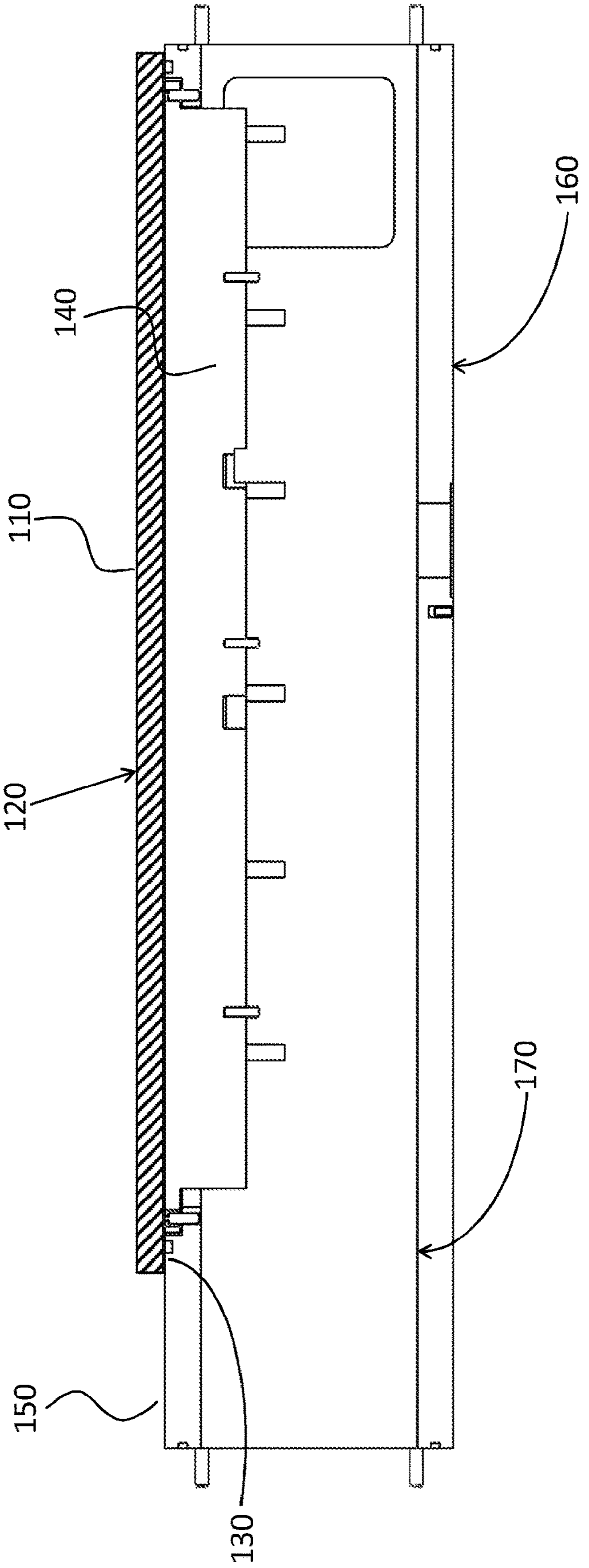
FIG. 3, in a schematic diagram, illustrates another view and/or perspective of a lid of a mass spectrometry system mounted to a vacuum chamber in accordance with one aspect of various embodiments of the present disclosure.

With reference to FIGS. 1-3, the lid 110 is shown in a mass spectrometry system. As shown schematically in FIG. 1, the lid 110 of a mass spectrometry system 105 is shown mounted to a vacuum chamber 150. FIG. 1 shows a portion of the vacuum chamber 150. The portion of the vacuum chamber 150 is shown as cut in order to provide views of the inside of the vacuum chamber 150, including, for example, views of a structure, internally mounted components, structure and positioning of mass spectrometry system components attached to the lid 110, etc. The cut out of FIG. 1 approximates the portion of the vacuum chamber 150 along the x-x plane of FIG. 2. The vacuum chamber 150 includes an outer surface 160 and an inner surface 170. In some embodiments, the lid 110 is engaged and substantially seals the vacuum chamber 150. In some embodiments, the lid can be used to seal the vacuum chamber down to a pressure of about $1\times10^{-6}$ Torr. In some embodiments, the lid seals the vacuum chamber and a pressure will be in a range of about $1\times10^{-4}$ Torr to about $1\times10^{-7}$ Torr. In some embodiments, the lid 110 includes one or more mounting holes 180 for attaching the lid 110 to the vacuum chamber 150. In this embodiment, the mounting holes 180 are shown for example to accommodate a bolt (not shown). In some embodiments, each through hole 180 can include, for example, a lip (not shown) or a washer (not shown) to capture a head of the bolt. The vacuum chamber 150 includes one or more anchoring holes 190. In some embodiments, the anchoring holes 190 could be threaded and configured to receive a bolt through the mounting holes 180 for attaching the lid 110 to the vacuum chamber 150.

The lid 110 includes an external surface 120. In some embodiments, when the lid is engaged with the vacuum chamber 150, the external surface 120 of the lid is exposed to the atmosphere. In some embodiments, the external surface 120 can be configured, for example, for mounting one or more RF and/or DC sources (not shown) of the mass spectrometry system and disposed in the external environment. The lid 110 includes an internal surface 130. The internal surface 130 opposes that of the external surface 120. In some embodiments, when the lid 110 is engaged with the vacuum chamber 150 the vacuum surface 130 can be exposed to vacuum pressures and/or high vacuum pressures. In some embodiments, the lid 110 is shown to include a support rail 145 having an ion guide 140 mounted to the support rail 145.

FIGS. 2 and 3 show alternate views of the lid 110 engaged with a mass spectrometry system. FIG. 2 shows a full view of the lid 110 including its eight mounting holes 180 useful to secure the lid 110 to the vacuum chamber 150. FIG. 2 shows the x-x and the y-y planes that bisect the vacuum chamber 150. FIG. 3 shows the lid 110 of a mass spectrometry system 105 mounted to the vacuum chamber 150. FIG. 3 shows a portion of the vacuum chamber 150. The portion of the vacuum chamber 150 is shown as cut in order to provide views of the inside of the vacuum chamber 150, including, for example, views of a structure, internally mounted components, structure and positioning of mass spectrometry system components attached to the lid 110 etc. The cut-out of FIG. 3 approximates the portion of the vacuum chamber 150 along the y-y plane of FIG. 2.

Figure 4:
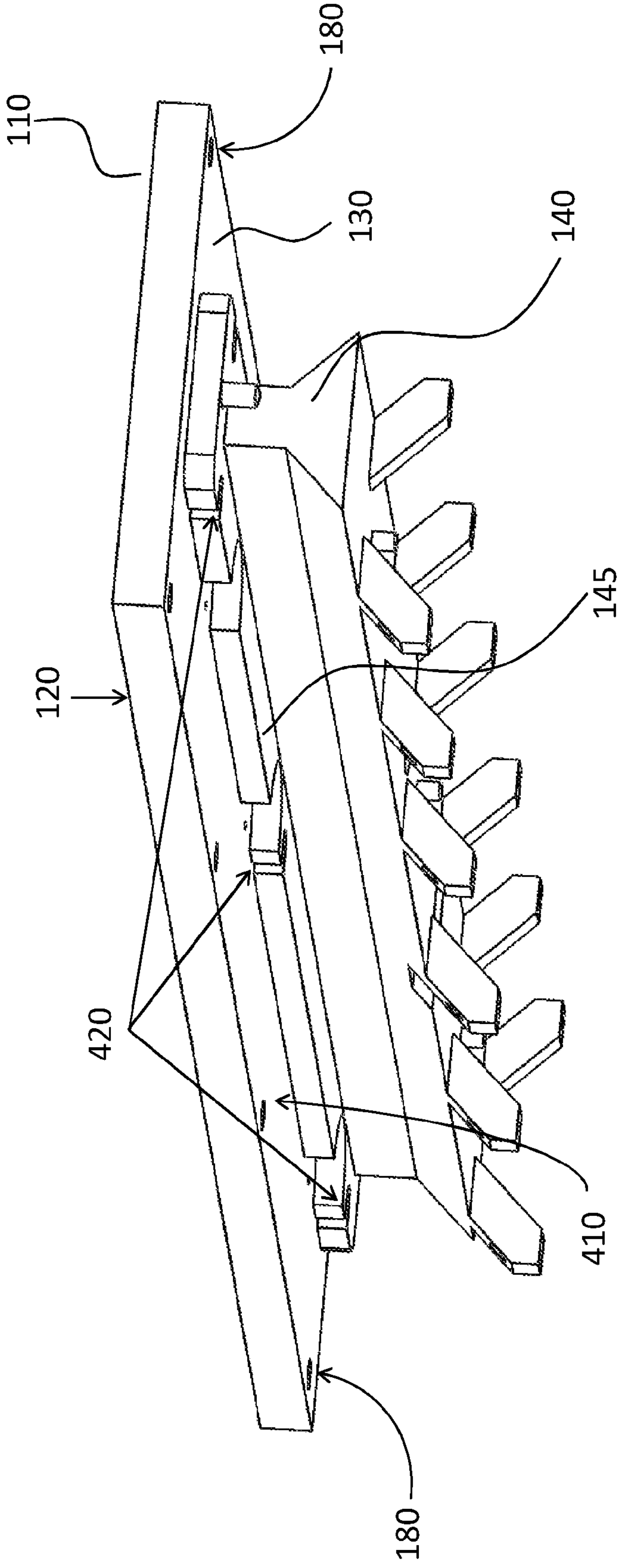
FIG. 4, in a schematic diagram, illustrates a lid in accordance with one aspect of various embodiments of the present disclosure.
Figure 5:
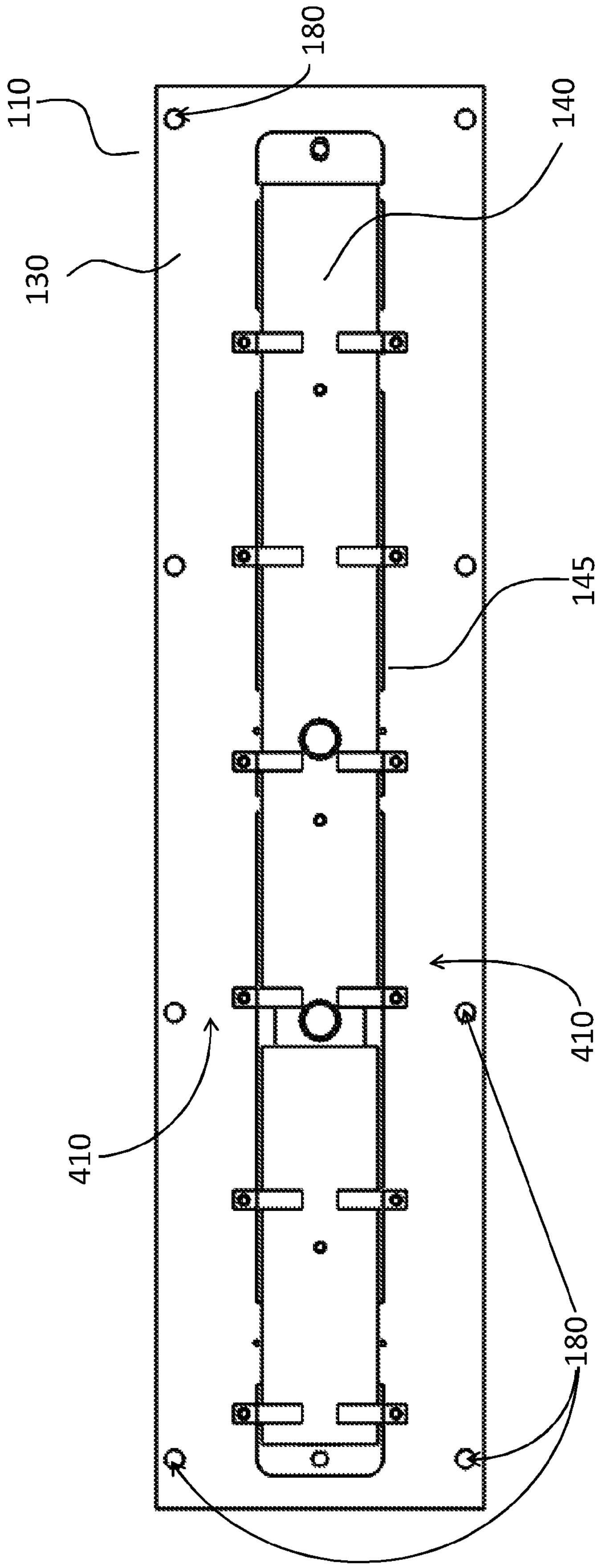
FIG. 5, in a schematic diagram, illustrates another view and/or perspective of a lid in accordance with one aspect of various embodiments of the present disclosure.
Figure 6:
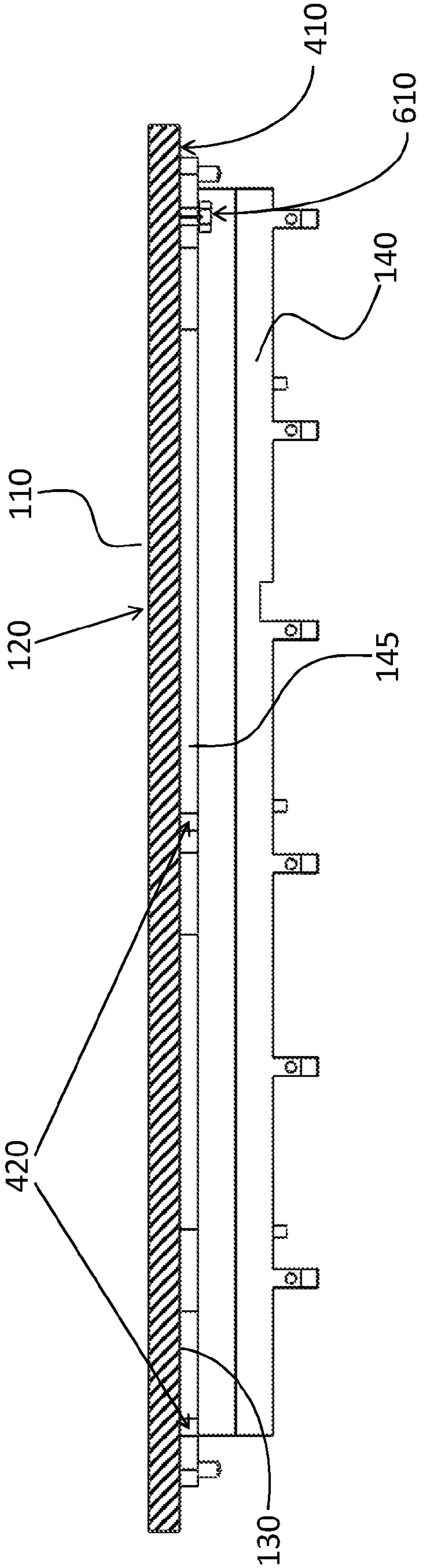
FIG. 6, in a schematic diagram, illustrates another view and/or perspective of a lid in accordance with one aspect of various embodiments of the present disclosure.
Figure 7:
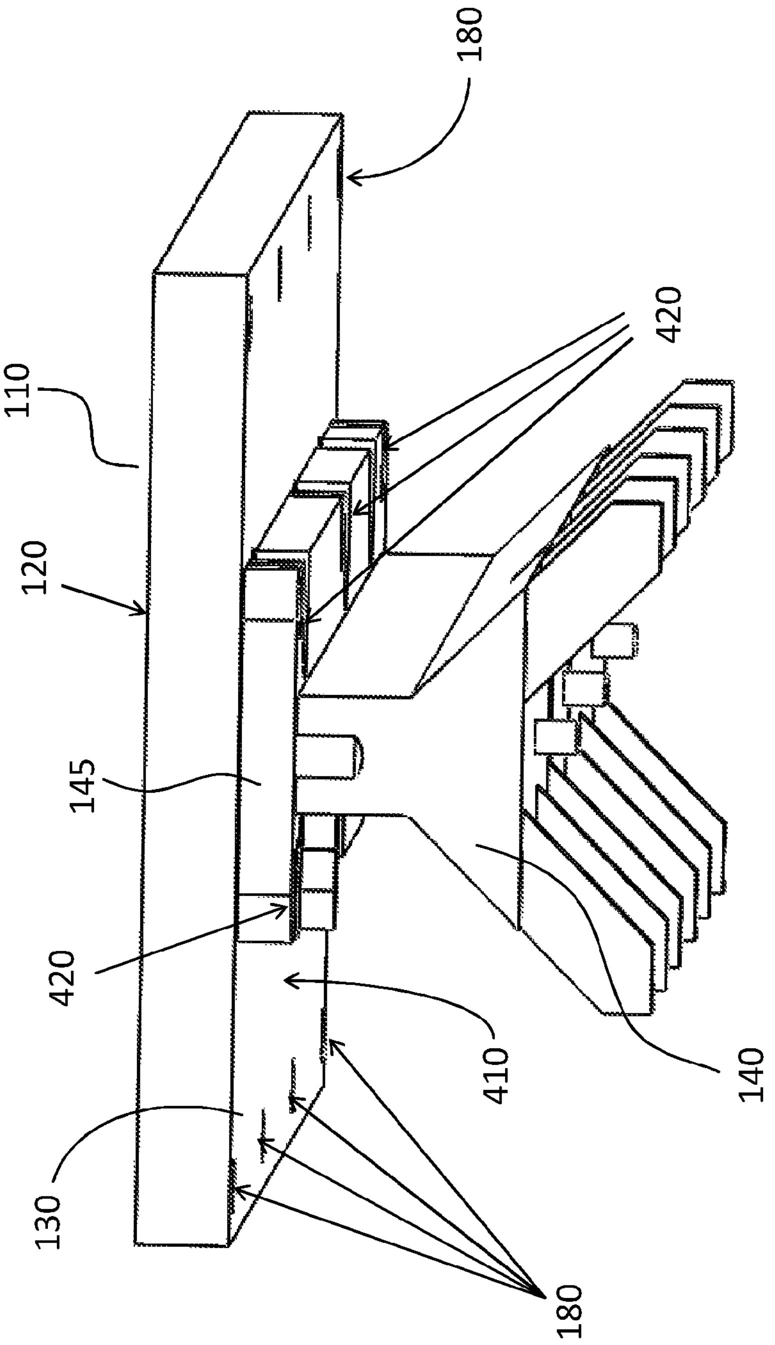
FIG. 7, in a schematic diagram, illustrates another view and/or perspective of a lid in accordance with one aspect of various embodiments of the present disclosure.
Figure 8:
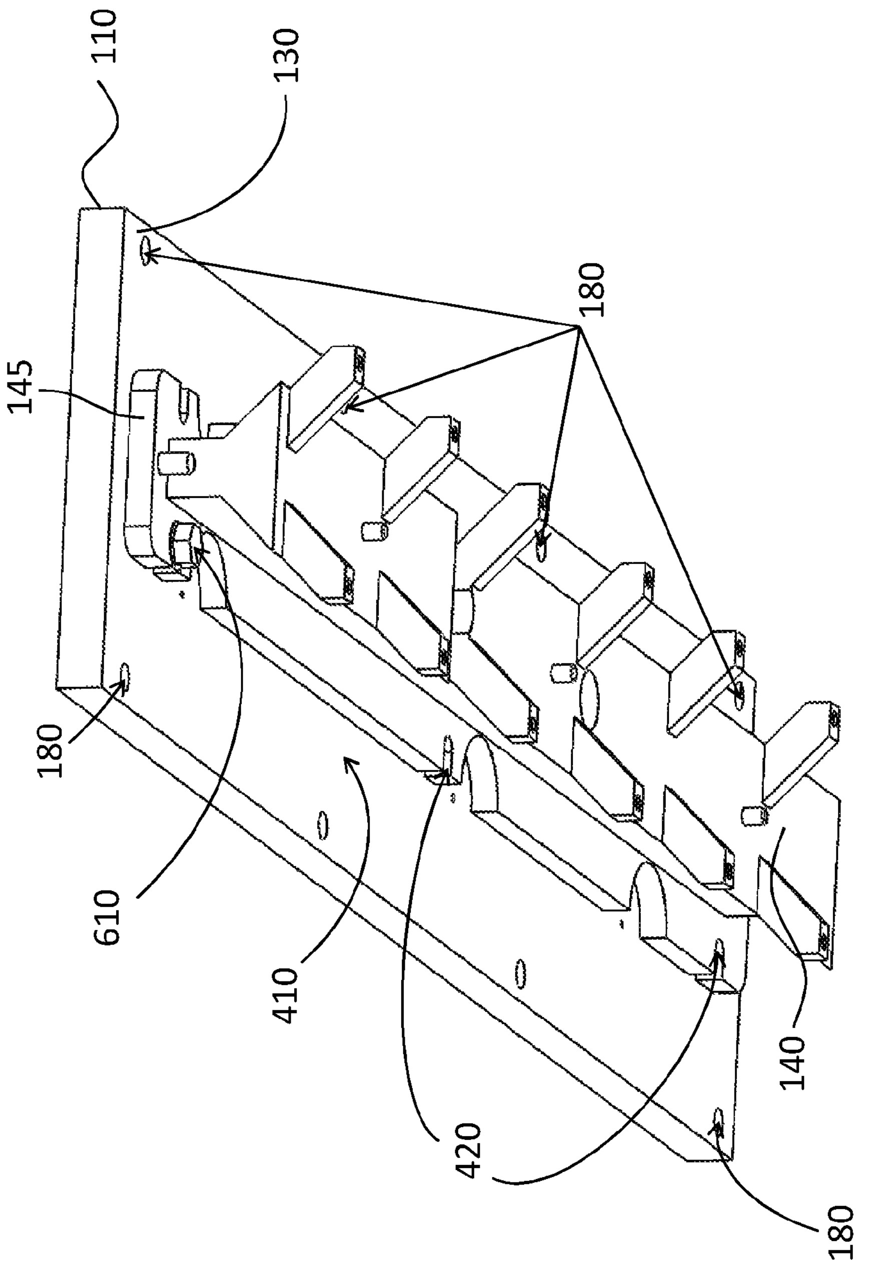
FIG. 8, in a schematic diagram, illustrates another view and/or perspective of a lid in accordance with one aspect of various embodiments of the present disclosure.

FIGS. 4-8 illustrate a perspective of lid 110. Lid 110 of FIG. 4 is shown as capable of attaching, connecting, coupling, and/or engaging with or to a mass spectrometry system. The lid 110 includes mounting holes 180 for fitting bolts to secure the lid 110 to the mass spectrometry system. The lid 110 includes an external surface 120. The lid 110 includes a vacuum surface 130. The external surface 120 and the vacuum surface 130 are opposite one another on the lid 110. The external surface 120 of the lid 110 is configured such that components can be mounted to it (not shown). The lid 110 is shown to include a mass spectrometry component mounted on the vacuum surface. Specifically, a support rail 145 is shown mounted to the lid 110. Ion guide components 140 are shown as mounted to the support rail 145. The vacuum surface 130 of the lid 110 includes contact elements 420. The vacuum surface 130 of the lid 110 includes a sealing surface 410 for engaging with an O-ring. FIG. 5, shows lid 110 from another perspective. FIG. 6, shows lid 110 from another perspective. FIG. 6 includes a component 610 connected to contact element 420. FIG. 7, shows lid 110 from another perspective. FIG. 8, shows lid 110 from another perspective.

FIGS. 1-8 show the lid engaged with a mass spectrometry system as in various aspects of some embodiments. FIGS. 1-8 show the lid's thickness from the external surface 120 to the vacuum surface 130. As disclosed in the present teachings, in some embodiments, the lid 110 can be fabricated from a substrate having a plurality of layers (not shown in detail in FIGS. 1-8).

Substrates

In some embodiments, the plurality of layers of the lid can include at least two layers attached or bonded together. In some embodiments, the plurality of layers are uniformly fabricated from the same material. In some embodiments, each layer of the plurality of layers can be fabricated from a different material. In some embodiments, the layers of the lid can be fabricated from electrically conductive materials. In some embodiments, the layers of the lid can be fabricated from electrically non-conductive materials. In some embodiments, the layers of the lid can be fabricated from, for example, copper, Rogers material, FR4, injection molded plastics, machined plastics, and/or machined composites, etc. In some embodiments, the lid can be engineered with the conductive and electrically non-conductive layers and materials arranged and constructed to optimize a design goal. In some embodiments, the lid can be arranged, for example as a PCB.

In some embodiments, a plurality of layers can be attached, bonded, or coupled to one another to form the lid. In some embodiments, the layers can include a bonding material disposed between at least two of the layers. In some embodiments, the bonding material can laterally extend between the layers. In some embodiments, the lateral extension can fully cover surfaces of the layers for bonding. In some embodiments, the lateral extension can partially cover surfaces of the layers for bonding. In some embodiments, the bonding material can be, for example, prepreg. In some embodiments, the lid can be substantially free of any epoxies and/or solders.

Contact Elements

Contact elements in accordance with various aspects of some embodiments of the present disclosure are shown in FIGS. 9-14.

Figure 9:
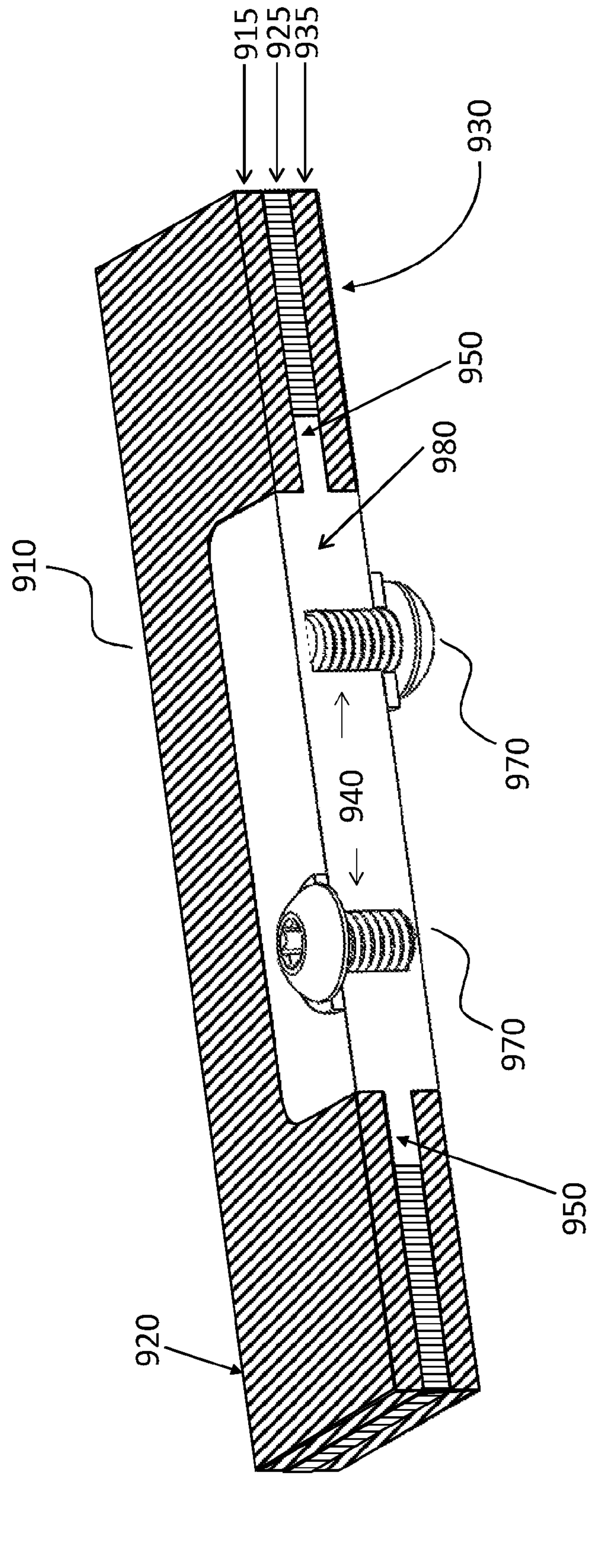
FIG. 9, in a schematic diagram, illustrates a contact element of a lid in accordance with one aspect of various embodiments of the present disclosure.

FIG. 9 illustrates a contact element 980 of a lid 910. In this embodiment, the lid 910 includes three layers. A first layer 915 having an external surface 920, which is adjacent to the external environment; a second layer 925; and a third layer 935 having a vacuum surface 930, which is adjacent to the vacuum chamber. In this embodiment, the layers, 915, 925, and 935 are fabricated from an electrically non-conductive material, such as FR4. The contact element 980 is configured to provide an electrical connection from an external surface 920 to the vacuum surface 930. In some embodiments, the contact element 980 can be fabricated from an electrically conductive material, for example, copper. In this embodiment, the contact element 980 is configured as an insert having tabs that extend, for interlocking the contact element 980 with the layers of the lid 910. In this embodiment, the contact element 980 is engaged and/or incorporated with the lid 910 via a central tab 950 that extends into and aligns with layer 925 of the lid 910 and interlocks between layers 915 and 935. In some embodiments, the contact element 980 is useful, for example, to provide a direct electrical connection from outside of the vacuum chamber to the inside thereof. In some embodiments, the electrically conductive contact element 980 is also useful, for example, to provide a thermally conductive surface area for that electrical connection, for example, to dissipate electrical heat generated during operation. The contact element 980 can include threaded connections 940 in the vacuum surface 930 and the external surface 920 of the lid 910. The threaded connections 940 can provide an electrical connection (not shown), for example, a wire or a lead to the contact element 980. In some embodiments, an electrical connection can be secured to the contact element 980 by bolts 970.

Figure 10:
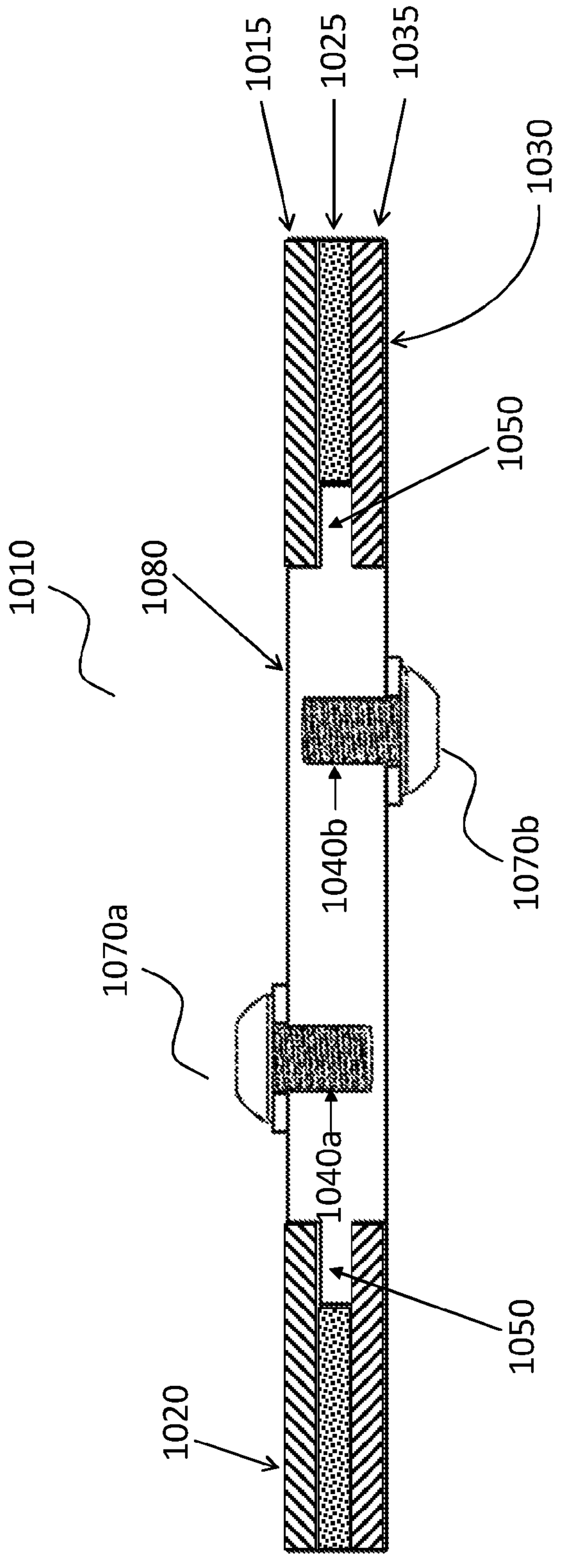
FIG. 10, in a schematic diagram, illustrates another view and/or perspective of a contact element of a lid in accordance with one aspect of various embodiments of the present disclosure.

FIG. 10 illustrates another view and/or perspective of an electrically conductive contact element 1080. The contact element 1080 can be configured to provide a direct electrical connection from an external surface 1020 of the lid 1010 to the vacuum surface 1030 of the lid 1010. For example, the contact element 1080 can be formed from a solid conductive material, such as, copper for electrically connecting these surfaces. In this embodiment, the lid 1010 includes three layers that surround and interlock the contact element 1010. A first layer 1015 having an external surface 1020, which is adjacent to the external environment; a second layer 1025; and a third layer 1035 having a vacuum surface 1030, which is adjacent to the vacuum chamber. In this embodiment, the layers, 1015, 1025, and 1035 are fabricated from an electrically non-conductive material, such as FR4 that electrically insulates the contact element 1080. The contact element 1080 can include threaded connections 1040*a* and 1040*b*. The threaded connections 1040*a* and 1040*b* can provide an electrical connection (not shown), for example, a wire or a lead to the contact element 1080. In some embodiments, an electrical connection can be secured to the contact element 1080 from the external environment by a bolt 1070*a* threaded into a threaded connections 1040*a* of the contact element 1080. In some embodiments, an electrical connection can be secured to the contact element 1080 from the vacuum chamber by a bolt 1070*b* threaded into a threaded connections 1040*b* of the contact element 1080. In this embodiment, the contact element 1080 can be fabricated as an insert having a central tab 1050 that extends to and aligns with layer 1025 of the lid 1010 and interlocks between layers 1015 and 1035. In some embodiments, the electrically conductive contact element 1080 is also useful, for example, to provide a thermally conductive surface area for the electrical connection, for example, to dissipate electrical heat generated during operation.

Figure 11:
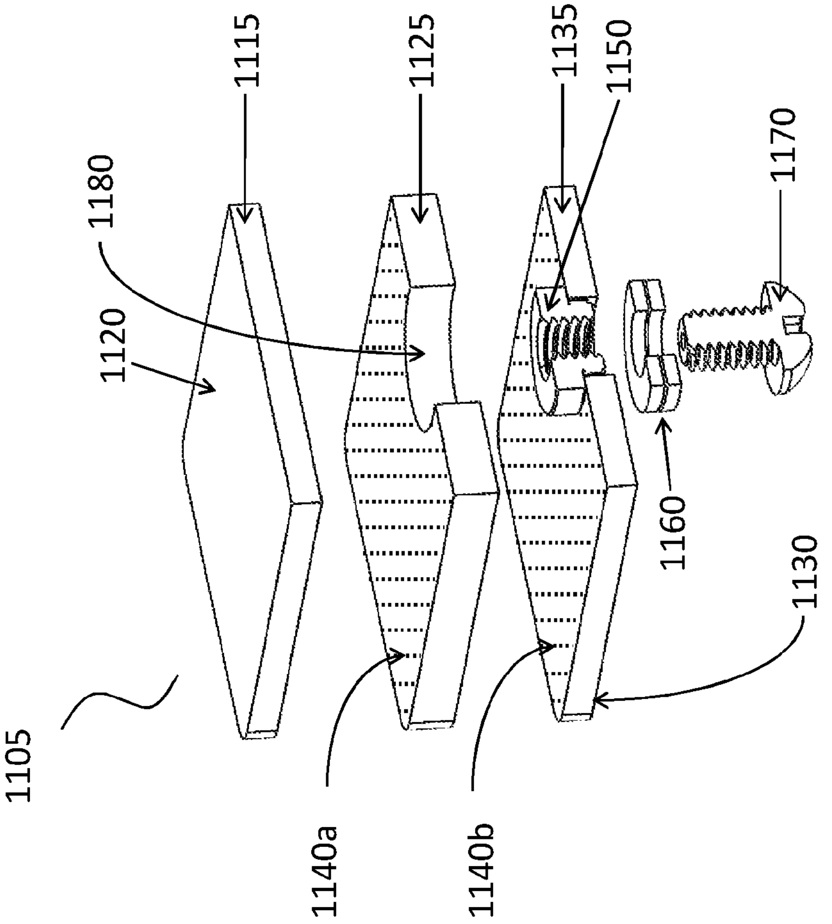
FIG. 11, in a schematic diagram, illustrates an exploded view of a threaded screw mount, which is an example of a contact element of a lid in accordance with one aspect of various embodiments of the present disclosure.

FIG. 11 illustrates an exploded view of a contact element 1105 engaged in a lid in accordance with various embodiments and aspects of the present disclosure. This embodiment shows a bolt 1170 configured to be threaded into the vacuum surface 1130 of the lid for providing mechanical attachment within the vacuum chamber. In this embodiment, contact element 1105 is useful, for example, as a mechanical anchor inside of the vacuum chamber. This embodiment illustrates three layers of the contact element 1105. A first layer 1115 having an external surface 1120, which is adjacent to the external environment; a second layer 1125; and a third layer 1135 having a vacuum surface 1130, which is adjacent to the vacuum chamber. The vacuum surface 1130 shows a pair of washers 1160 adjacent, aligned and configured to be placed on the bolt 1170 before it is to be threaded. This embodiment shows the third layer 1135 of the lid includes a threaded nut 1150, for example, a PEM® nut, that is press fit into the third layer 1135 so that the threads of the threaded nut 1150 are accessible from the vacuum surface 1130 of the lid. A bonding layer 1140*a* is disposed between the first layer 1115 and the second layer 1125 for connecting those layers to one another. A bonding layer 1140*b* is disposed between the second layer 1125 and the third layer 1135 for connecting those layers to one another. The bonding layer 1140 is configured to, with the addition of heat and pressure applied toward a center of the contact element 1105, adhere, affix, attach, bond, connect, and/or seal the layers together. The bolt 1170 is configured to be threaded into the threaded nut 1150 from the vacuum surface 1130. A cavity 1180 is formed into the second layer 1125 of the lid. In some embodiments, the cavity 1180 provides space behind and around the threaded nut 1150 for venting or outgas sing when the mass spectrometry system is under vacuum. The bolt 1170 is shown as having a vent hole through the middle, so the bolt 1170 can help with outgas sing.

Figure 12:
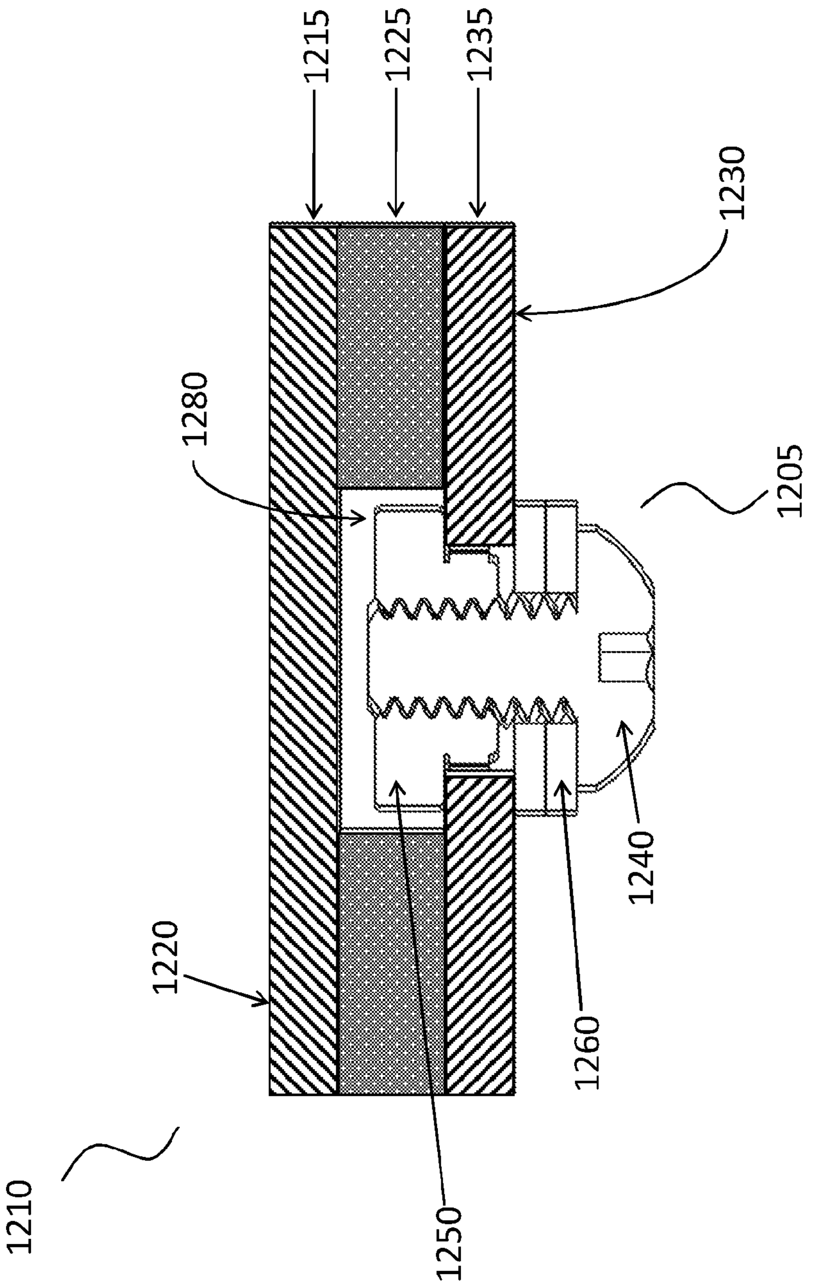
FIG. 12, in a schematic diagram, illustrates another view and/or perspective of a threaded screw mount, which is an example of a contact element of a lid in accordance with one aspect of various embodiments of the present disclosure.

FIG. 12 illustrates a perspective view of a contact element 1205 engaged in a lid 1210 in accordance with various embodiments and aspects of the present disclosure. This embodiment shows a bolt 1240 engaged with the contact element 1205 of the lid 1210. In this embodiment, contact element 1205 is useful, for example, as a mechanical anchor inside of the vacuum chamber. This embodiment illustrates three layers of the contact element 1205. A first layer 1215 having an external surface 1220, which is adjacent to the external environment; a second layer 1225; and a third layer 1235 having a vacuum surface 1230, which is adjacent to the vacuum chamber. In this embodiment, there is a bolt 1240 threaded through pair of washers 1260 and into a threaded nut 1250, for example, a PEM® nut, that is press fit into the third layer 1235 of the lid 1210. A cavity 1280 is formed into the second layer 1225 of the lid 1210. In some embodiments, the cavity 1280 provides space behind and around the threaded nut 1250 for venting or outgassing when the mass spectrometry system is under vacuum. The bolt 1240 is shown as having a vent hole through the middle, so the bolt 1240 can help with outgassing.

Figure 13:
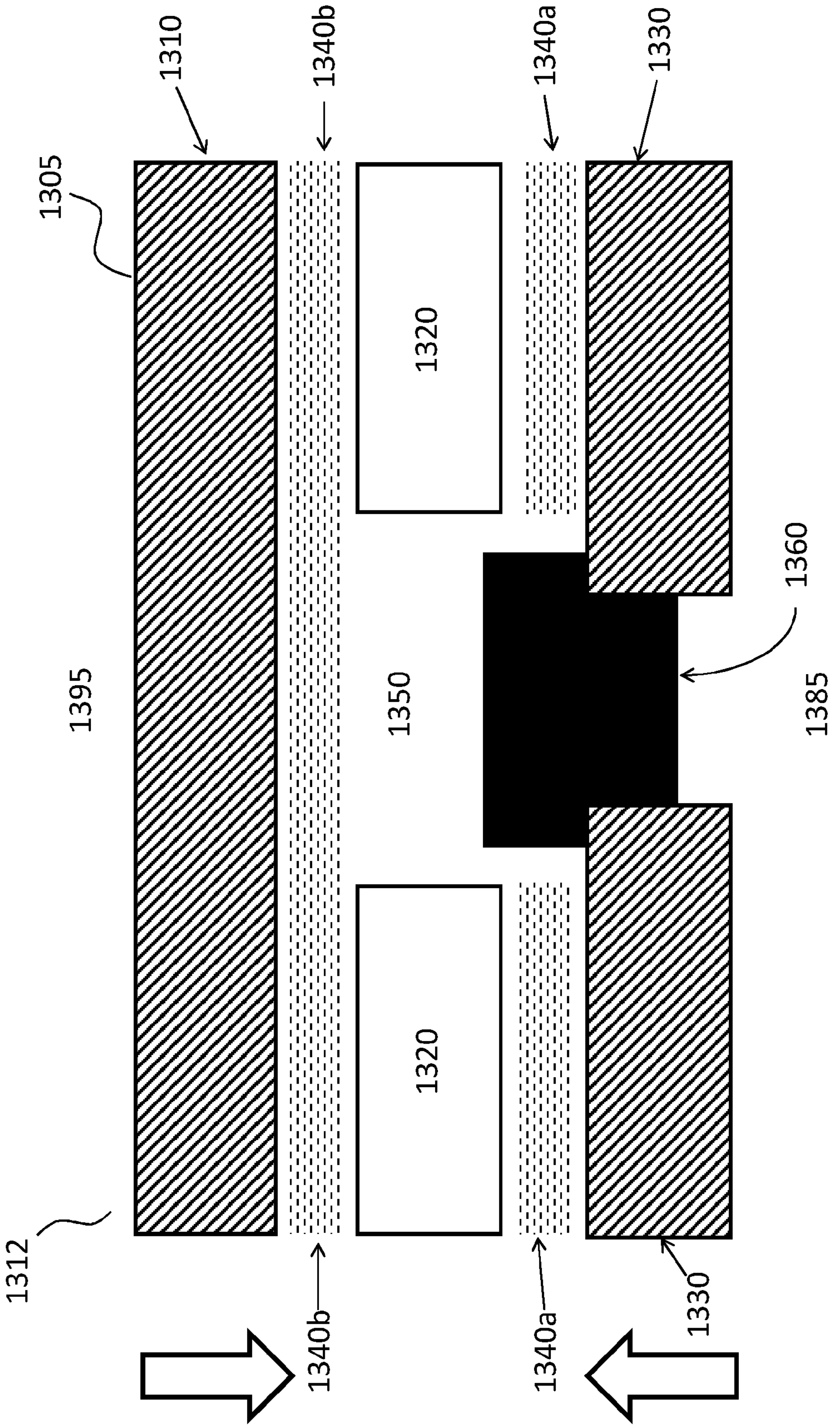
FIG. 13, in a schematic diagram, illustrates an exploded view of a contact element of a lid in accordance with one aspect of various embodiments of the present disclosure and provides a method of assembly in accordance with one aspect of various embodiments of the present disclosure.

FIG. 13 illustrates an exploded view of the contact element 1305 engaged with a lid 1312 in accordance with one aspect of various embodiments of the present disclosure. This embodiment shows a connector 1360 useful, for example, as a mechanical anchor inside of the vacuum chamber. This embodiment illustrates three layers of the contact element 1305, a first layer 1310, a second layer 1320, and a third layer 1330. In this embodiment, the layers 1310, 1320, and 1330 are fabricated from an electrically non-conducting material. In some embodiments, the layers could be fabricated from an electrically non-conducting material, for example, Rogers material, FR4, and other prepreg derivatives. In some embodiments, the layers could be fabricated from a conducting material, for example, copper, silver, gold, nickel, tin, carbon ink, etc. In some embodiments, the layers could be fabricated with metal plating, for example, copper, silver, gold, nickel, or tin plating. This embodiment, shows the connector 1360 press fit into the third layer 1330. The connector 1360 is shown as press fit from the atmospheric-side surface of the third layer 1330 toward the vacuum surface of the lid 1312. The connector 1360 could, however be, for example, a threaded connector, a slotted connector, a press-fit connector, a micro-jack connector, etc. FIG. 13 shows a first bonding layer 1340*a* surrounding the exemplary press fit connector 1360 and on top a surface of the third layer 1330. In this embodiment, the bonding material includes prepreg. The second layer is shown with a cavity 1350 formed in the center. The cavity 1350 is useful for venting the contact element 1305 to allow for outgassing when it is exposed to the vacuum chamber 1385 during operation. The first bonding layer 1340*a* is also shown with a cavity 1350 formed in the center. A second bonding layer 1340*b* is on top of the second layer 1320. The top layer 1310 is placed on top of the second bonding layer. The present methods of assembly include applying pressure in the direction of the arrows and heating to adhere, affix, attach, bond, connect, and/or seal the layers together according to material specifications.

Figure 14:
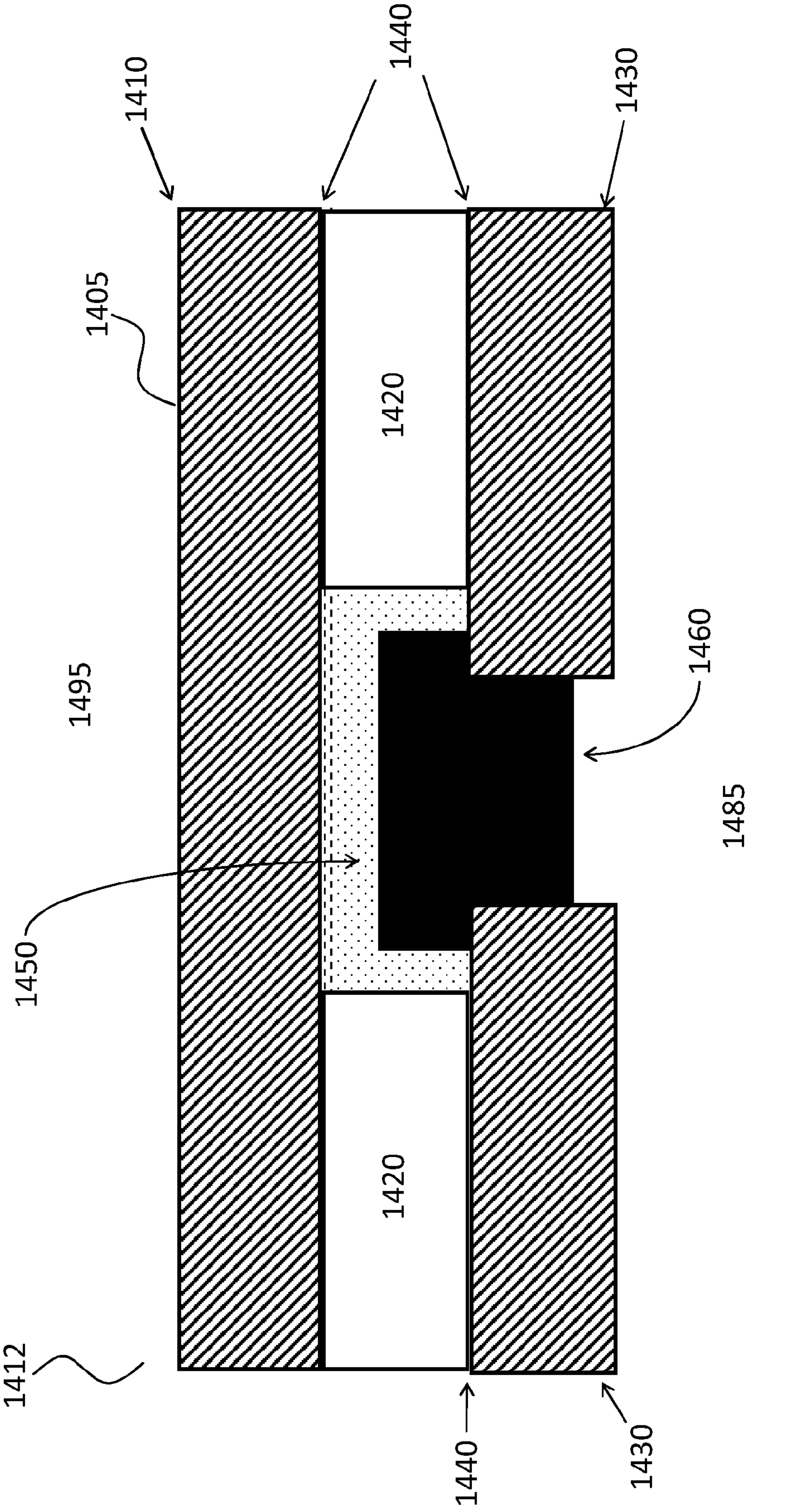
FIG. 14, in a schematic diagram, illustrates a contact element of a lid in accordance with one aspect of various embodiments of the present disclosure.

FIG. 14 illustrates a contact element 1405 of a lid 1412 in accordance with one aspect of various embodiments of the present disclosure. This embodiment shows a connector 1460 useful, for example, as a mechanical anchor inside of the vacuum chamber. In this embodiment, the layers 1410, 1420, and 1430 are fabricated from an electrically non-conducting material. In some embodiments, the layers could be formed, for example, from FR4, Rogers material, and other prepreg derivatives. In some embodiments, the layers could be fabricated from a conducting material, for example, copper, silver, gold, nickel, tin, carbon ink, etc. In some embodiments, the layers could be fabricated with metal plating, for example, copper plating. This embodiment, shows the connector 1460 press fit into the atmospheric side of the third layer 1430. The connector 1460 could be, for example, a threaded connector, a slotted connector, a pressfit connector, a micro-jack connector, etc. In this embodiment, a cavity 1450 is shown in the center of the second layer 1420. The cavity 1450 is useful for venting the contact element 1405 to allow for outgassing when it is exposed to the vacuum chamber 1485 during operation.

Electrically Conductive Traces

Figure 15:
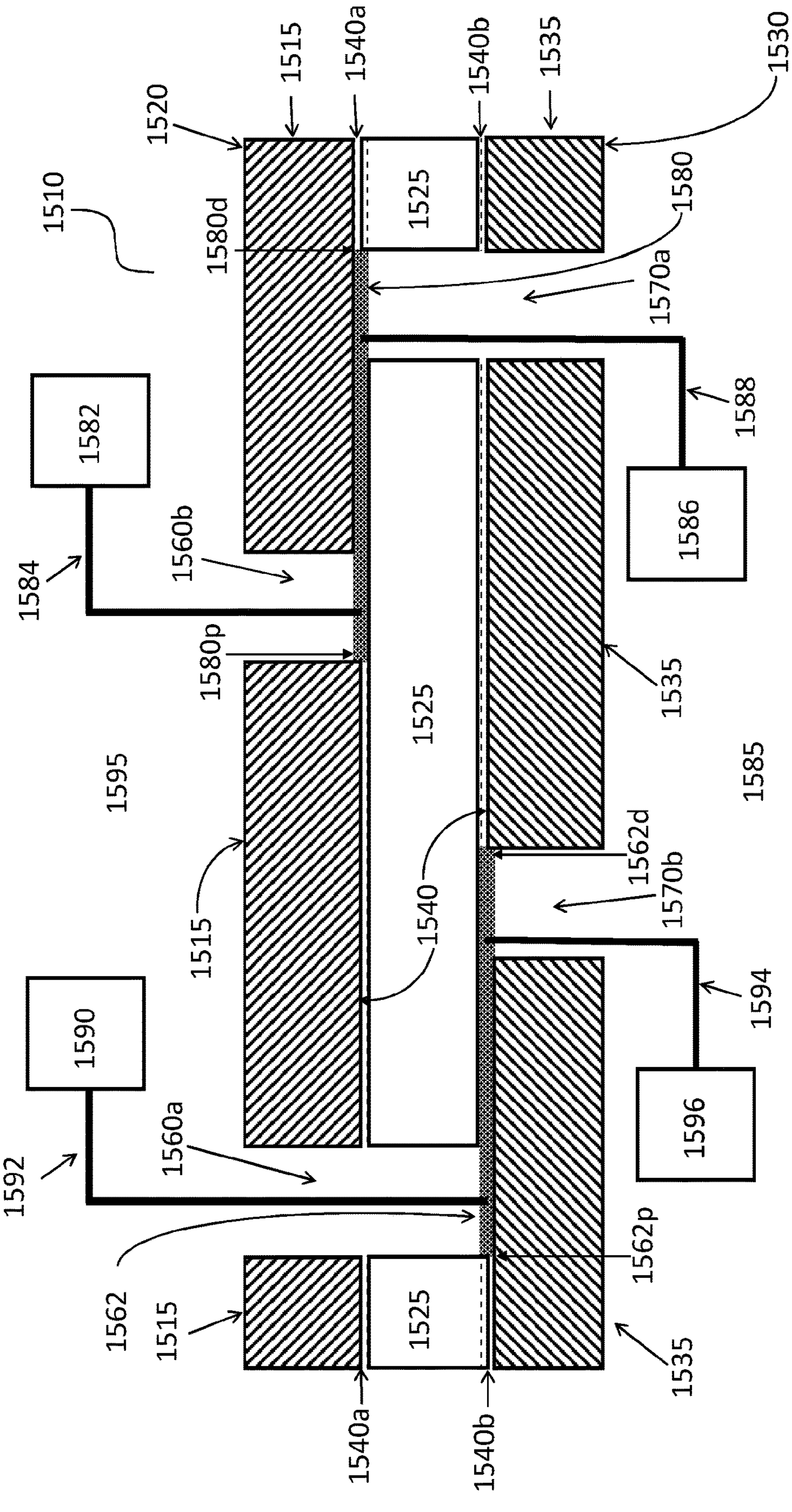
FIG. 15, in a schematic diagram, illustrates electrically conductive traces and channels and/or vias of a lid in accordance with one aspect of various embodiments of the present disclosure.

FIG. 15 illustrates a lid 1510 having electrically conductive traces 1562 and 1580 in between the layers of the lid in accordance with one aspect of various embodiments of the present disclosure. This embodiment shows electrically conductive traces 1562 and 1580 for providing power from the external environment to the inside of the vacuum chamber for the mass spectrometry system. The lid shown in this embodiment includes a first layer 1515, a second layer 1525, and a third layer 1535. The lid 1510 also includes several channels and/or vias 1560*a/b* and 1570*a/b*, so that an operator has access to the electrically conductive trace 1562 from the external environment 1595 and the electrically conductive trace 1580 through vacuum chamber 1585.

In this embodiment, the layers 1515, 1525, and 1535 can be formed from an electrically non-conducting material, for example, Rogers material, FR4, and other prepreg derivatives. The third layer 1535 is shown adjacent to the vacuum chamber 1585 and having a vacuum surface 1530. In this embodiment, the third layer 1535 is shown as having two channels and/or vias 1570*a* and 1570*b*. These channels and/or vias 1570*a* and 1570*b* are open to the vacuum chamber 1585. A first bonding layer 1540*b* is disposed on at least a portion of the atmospheric side of the third layer 1535. The first bonding layer 1540*b* is formed, for example, from prepreg. An electrically conductive trace 1562 is disposed on at least on a portion of the atmospheric side of the third layer 1535 and the first bonding layer 1540*b*. The second layer 1525 is shown as disposed on the first bonding layer 1540*b* and the electrically conductive trace 1562. In this embodiment, the second layer 1525 is shown as having two channels and/or vias 1570*a* and 1560*a*. The channel and/or via 1570*a* is open to the vacuum chamber 1585. The channel and/or via 1560*a* is open to the external environment 1595, that is open to atmosphere. A second bonding layer 1540*a* is disposed on at least a portion of the atmospheric side of the second layer 1525. The second bonding layer 1540*a* is formed, for example, from prepreg. An electrically conductive trace 1580 is disposed on at least on a portion of the atmospheric side of the second layer 1525 and the second bonding layer 1540*a*. The first layer 1515 is shown as disposed on the second bonding layer 1540*a* and the electrically conductive trace 1580. In this embodiment, the first layer 1515 is shown as having two channels and/or vias 1560*a* and 1560*b*. These channels and/or vias 1560*a/b* are open to the external environment 1595. The channels and/or vias 1560*a/b* and 1570*a/b*, for example, are gaps, holes, openings, and/or spaces etc. In some embodiments, these channels and/or vias can be filled. In some embodiments, a filler can be, for example, a conductive epoxy and/or a similar conductive bonding derivative thereof. These gaps, holes, openings, and/or spaces etc., can be formed in the materials, for example, through fabrication and/or an arrangement of the layers of the lid.

In this embodiment, the electrically conductive traces 1562 and 1580 can be fabricated from any electrically conductive material, for example, copper or silver gold, nickel, tin, carbon ink, etc. The electrically conductive trace 1562 includes a proximal end 1562*p* and a distal end 1562*d*. The proximal end of the electrically conductive trace 1562*p* is disposed of and extended within the channel and/or via 1560*a* such that it is accessible by an electrical lead and/or contact 1592 from the external environment 1595. The distal end of the electrically conductive trace 1562*d* is disposed of and extended within the channel and/or via 1570*b* such that it is accessible by an electrical lead and/or contact 1594 from the vacuum chamber 1585. The electrically conductive trace 1580 includes a proximal end 1580*p* and a distal end 1580*p*. The proximal end of the electrically conductive trace 1580*p* is disposed of and extended within the channel and/or via 1560*b* such that it is accessible by an electrical lead and/or contact 1584 from the external environment 1595. The distal end of the electrically conductive trace 1580*d* is disposed of and extended within the channel and/or via 1570*a* such that it is accessible by an electrical lead and/or contact 1588 from the vacuum chamber 1585.

In this embodiment, the electrically conductive traces connect the external environment with the vacuum chamber. FIG. 15 shows electrically conductive trace 1562 connected by the electrical lead and/or contact 1592 to an RF power supply 1590 disposed in the external environment 1595. FIG. 15 shows electrically conductive trace 1562 connected by the electrical lead and/or contact 1594 to an RF component 1596 disposed in the vacuum chamber 1585. In this embodiment, the electrically conductive traces connect the external environment with the vacuum chamber. FIG. 15 shows electrically conductive trace 1580 connected by the electrical lead and/or contact 1584 to a DC power supply 1582 disposed in the external environment 1595. FIG. 15 shows electrically conductive trace 1580 connected by the electrical lead and/or contact 1588 to a DC component 1586 disposed in the vacuum chamber 1585. In this embodiment, because all of the layers and bonding materials are electrically non-conducting, the electrically conductive traces 1562 and 1580 are electrically isolated from one another.

As shown in FIG. 15, the channel and/or via 1560*a* is laterally displaced from the channel and/or via 1570*b*. Additionally, the channel and/or via 1560*b* is laterally displaced from the channel and/or via 1570*a*. The lateral displacement helps with sealing the vacuum chamber 1585 from the external environment 1595, such that an attainable vacuum pressure level of the chamber is at least about $1\times10^{-6}$ Torr to about $1\times10^{-8}$ Torr.

Figure 16:
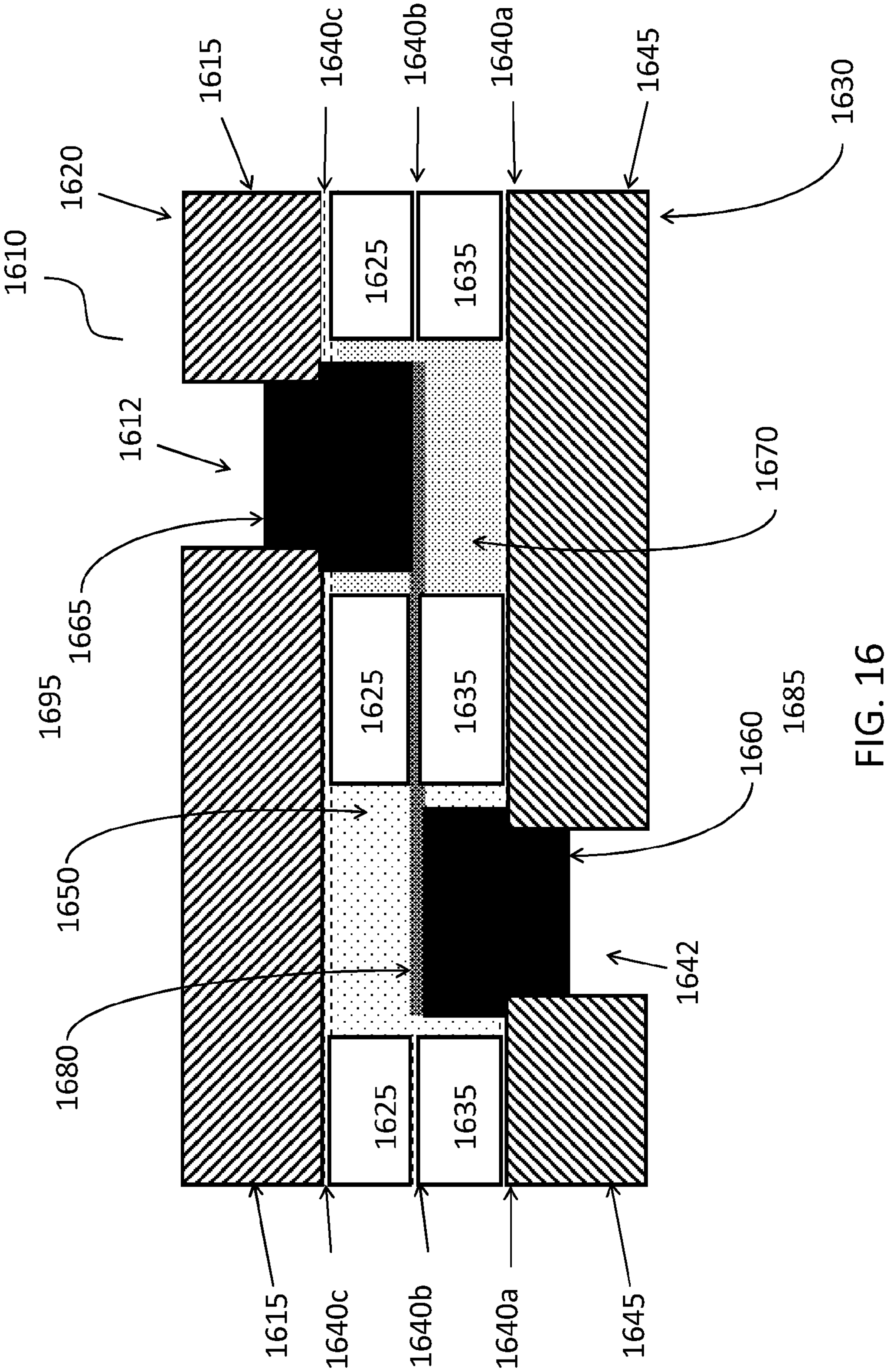
FIG. 16, in a schematic diagram, illustrates contact elements of a lid in accordance with one aspect of various embodiments of the present disclosure electrically connected via an electrically conductive trace in accordance with one aspect of various embodiments of the present disclosure.

FIG. 16 illustrates a lid 1610 having an electrically conductive trace 1680 in between the layers of the lid in accordance with one aspect of various embodiments of the present disclosure. This embodiment shows contact elements 1660 and 1665 that are electrically connected via the electrically conductive trace 1680 in the lid 1610 for providing power from the external environment to the inside of the vacuum chamber for the mass spectrometry system. The lid 1610 shown in this embodiment includes a first layer 1615, a second layer 1625, a third layer 1635, and a fourth layer 1645.

In this embodiment, the layers 1615, 1625, 1635 and 1645 can be formed from an electrically non-conducting material, for example, Rogers material, FR4, and other prepreg derivatives.

The fourth layer 1645 is shown adjacent to the vacuum chamber 1685 and having a vacuum surface 1630. A first bonding layer 1640*a* is disposed on at least a portion of the atmospheric side of the fourth layer 1645. The first bonding layer 1640*a* is formed, for example, from prepreg. The third layer 1635 is shown disposed on the atmospheric side of the first bonding layer 1640*a*. A second bonding layer 1640*b* is disposed on at least a portion of the atmospheric side of the third layer 1635. The second bonding layer 1640*b* is formed, for example, from prepreg. The second layer 1625 is shown disposed on the atmospheric side of the second bonding layer 1625. A third bonding layer 1640*c* is disposed on at least a portion of the atmospheric side of the second layer 1625. The third bonding layer 1640*c* is formed, for example, from prepreg. The first layer 1615 is shown disposed on the atmospheric side of the third bonding layer 1640*c*. The first layer 1615 is shown adjacent to the external environment 1695.

In this embodiment, the fourth layer 1645 is shown as having a contact element 1660 embedded or engaged into it from the atmospheric side surface. The contact element 1660 is fabricated from an electrically conductive material. In some embodiments, the contact element 1660 is a threaded element, for example, a PEM® nut. In some embodiments, the contact element 1660, for example, can be threaded and configured for securing a bolt (not shown) to be mounted from the vacuum chamber 1685. In this embodiment, the fourth layer 1645 is shown as having an opening 1642 to the vacuum chamber 1685 to provide access to the contact element 1660. In this embodiment, the first layer 1615 is shown as having a contact element 1665 embedded or engaged into it from the vacuum side surface. The contact element 1665 is fabricated from an electrically conductive material. In some embodiments, the contact element 1665 is a threaded element, for example, a PEM® nut. In some embodiments, the contact element 1665, for example, can be threaded and configured for securing a bolt (not shown) to be mounted from the external environment 1695. In this embodiment, the first layer 1615 is shown as having an opening 1612 to the external environment 1695 to provide access to the contact element 1665. In some embodiments, the contact element 1665 (e.g. a threaded PEM® nut) is electrically conductive and pressed into the non-electrically conductive layer board. In this embodiment, the contact element 1665, that is the threaded PEM® nut, can be a fastener as well as an electrical connection.

An electrically conductive trace 1680 is disposed on at least on a portion of each of the contact elements 1660 and 1665. In this embodiment, the electrically conductive trace 1680 can be fabricated from any electrically conductive material, for example, copper or silver gold, nickel, tin, carbon ink, etc. In this embodiment, the electrically conductive trace is shown between the second layer 1635 and the third layer 1625, for example, sandwiched between these layers. In this embodiment, the second and third layers 1635 and 1625 can be formed from an electrically non-conductive material, such as FR4, Rogers material, and/or other prepreg derivatives.

In this embodiment, the lid 1610 is shown to include cavities 1650 and 1670. These cavities 1650 and 1670 are gaps, holes, and/or spaces around the contact elements 1660 and 1665 and are useful to help vent the contact elements 1660 and 1665 to allow for outgassing when the lid 1610 is exposed to the vacuum chamber 1685 during operation and when the mass spectrometry system is under vacuum.

As shown in FIG. 16, in this embodiment, the contact elements 1660 and 1665 are laterally displaced from one another using threaded isolated electrical connections between the vacuum surface and the external surface for the lid that are substantially vacuum tight, mechanically sound, and solder-free and/or epoxy free. The press fit contact elements and lateral displacement helps with sealing the vacuum chamber 1685 from the external environment 1695, such that an attainable vacuum pressure level of the chamber is at least about $1\times10^{-6}$ Torr or to about $1\times10^{-8}$ Torr.

Built-In Capacitance

Figure 17:
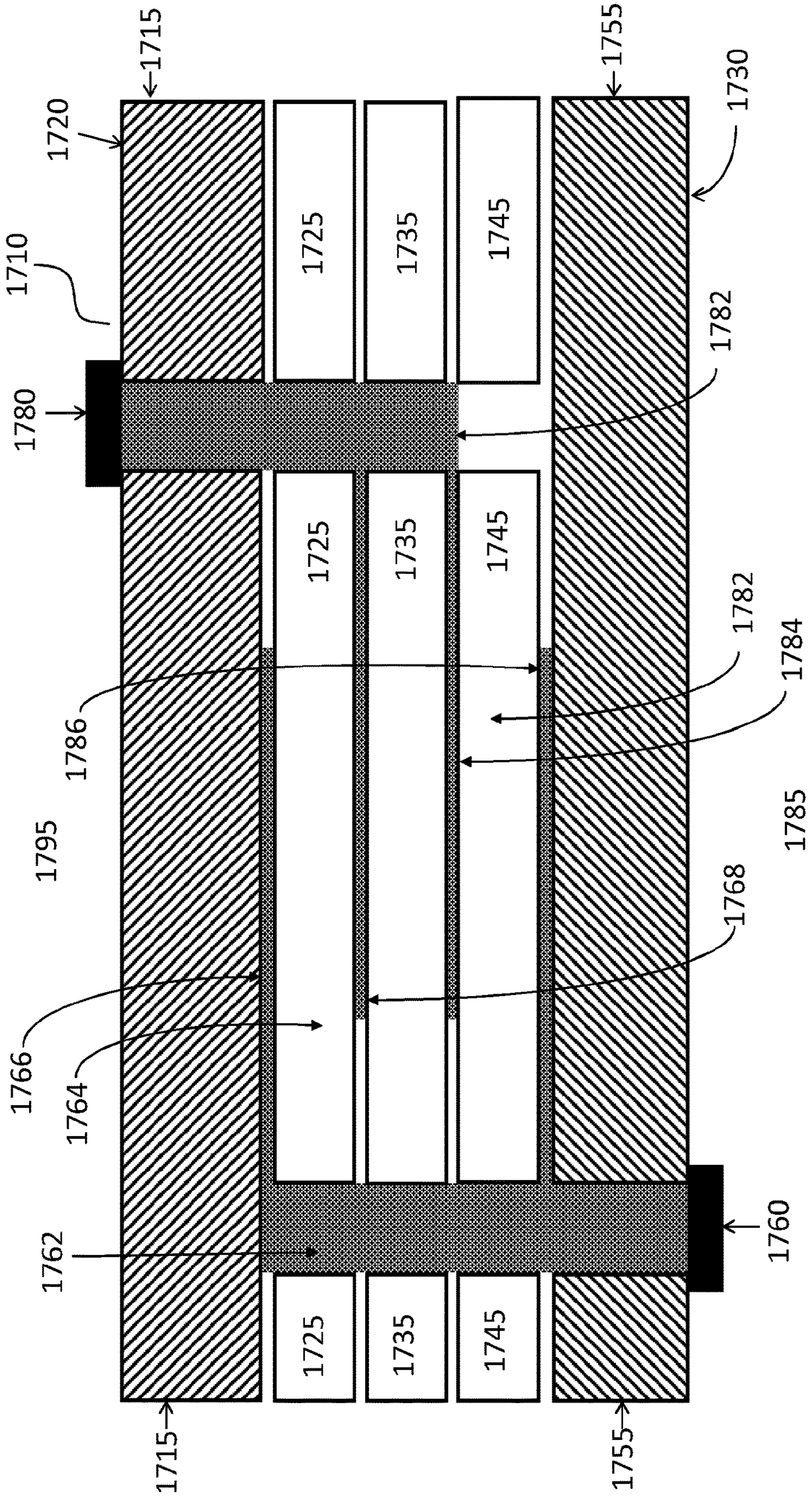
FIG. 17, in a schematic diagram, illustrates a capacitor within a lid in accordance with one aspect of various embodiments of the present disclosure.

FIG. 17 illustrates a lid 1710 configured to have a built-in capacitor in accordance with one aspect of various embodiments of the present disclosure. The lid 1710 shown in this embodiment includes a first layer 1715, a second layer 1725, a third layer 1735, a fourth layer 1745, and a fifth layer 1755. In this embodiment, the layers 1715, 1725, 1735, 1745, and 1755 can be formed from an electrically non-conducting material, for example, Rogers material, FR4, and other prepreg derivatives.

This embodiment shows electrically conductive traces 1766, 1768, 1784, and 1786, in the lid 1710 for providing power from the external environment to the inside of the vacuum chamber for the mass spectrometry system. This embodiment includes a contact element 1760 on the vacuum surface. This embodiment also includes a channel and/or via 1762. In this embodiment, the channel and/or via 1762 has a wire or is filled with an electrically conductive solder and/or paste. This embodiment also includes a contact element 1780 on the external surface. This embodiment includes a channel and/or via 1782. In this embodiment, the channel and/or via 1782 has a wire or is filled with an electrically conductive solder and/or paste.

The fifth layer 1755 is shown adjacent to the vacuum chamber 1785 and having a vacuum surface 1730. The bonding layers that seal each of the layers to one another are formed, for example from prepreg. The bonding layers are not explicitly shown in this example. The fourth layer 1745 is the next substrate layer. An electrical trace 1786 is disposed between 1755 and 1745. The third substrate layer 1735 is the next adjacent substrate layer. An electrical trace 1784 is disposed between 1745 and 1735. The second substrate layer 1725 is the next adjacent substrate layer. An electrical trace 1766 is disposed between 1735 and 1725. The first substrate layer 1715 is the top substrate layer. An electrical trace 1768 is disposed between 1725 and 1715.

In this embodiment, built-in capacitors are formed from conductive materials of the electrically conductive traces and the dielectric materials used to fabricate the substrate layers. In particular, in this embodiment, an electrically conductive path extending from the vacuum surface to the external surface having a capacitance built-in exist between electrically conductive traces 1766 and 1768 and the second substrate layer 1725, formed from an electrically non-conducting material, for example, Rogers material, FR4, etc. In this embodiment, an electrically conductive path extending from the external surface to the vacuum surface having a built-in capacitance exists between electrically conductive traces 1786 and 1784 and the fourth substrate layer 1745, formed from an electrically non-conducting material, for example, Rogers material, FR4, etc. In some embodiments, electrical conductivity, electrical resistivity, and material thickness of the electrically conductive traces and the substrate layers will affect capacitance of the lid.

EXEMPLIFICATION

The following examples illustrate some embodiments and aspects of the present disclosure. It will be apparent to those skilled in the relevant art that various modifications, additions, substitutions, and the like can be performed without altering the spirit or scope of the disclosure, and such modifications and variations are encompassed within the scope of the disclosure as defined in the claims, which follow. The present disclosure will be more fully understood by reference to these examples. The following examples do not in any way limit the present disclosure or the claimed disclosures and they should not be construed as limiting the scope.

Example 1

The present example discloses using a large and relatively thick PCB to act as an instrument lid. The PCB has multiple functionalities built into it. One of the problems of traditional vacuum feedthroughs that the present embodiment solves is passing RF A/B voltage from the atmosphere side of the mass spectrometry system to vacuum side of the mass spectrometry system without any additional feedthroughs, while simultaneously acting as a lid for the instrument where the lid includes a sealing surface to maintain the vacuum.

FIGS. 18-21 illustrate layers of the PCB lid assembly of this embodiment.

Figure 18:
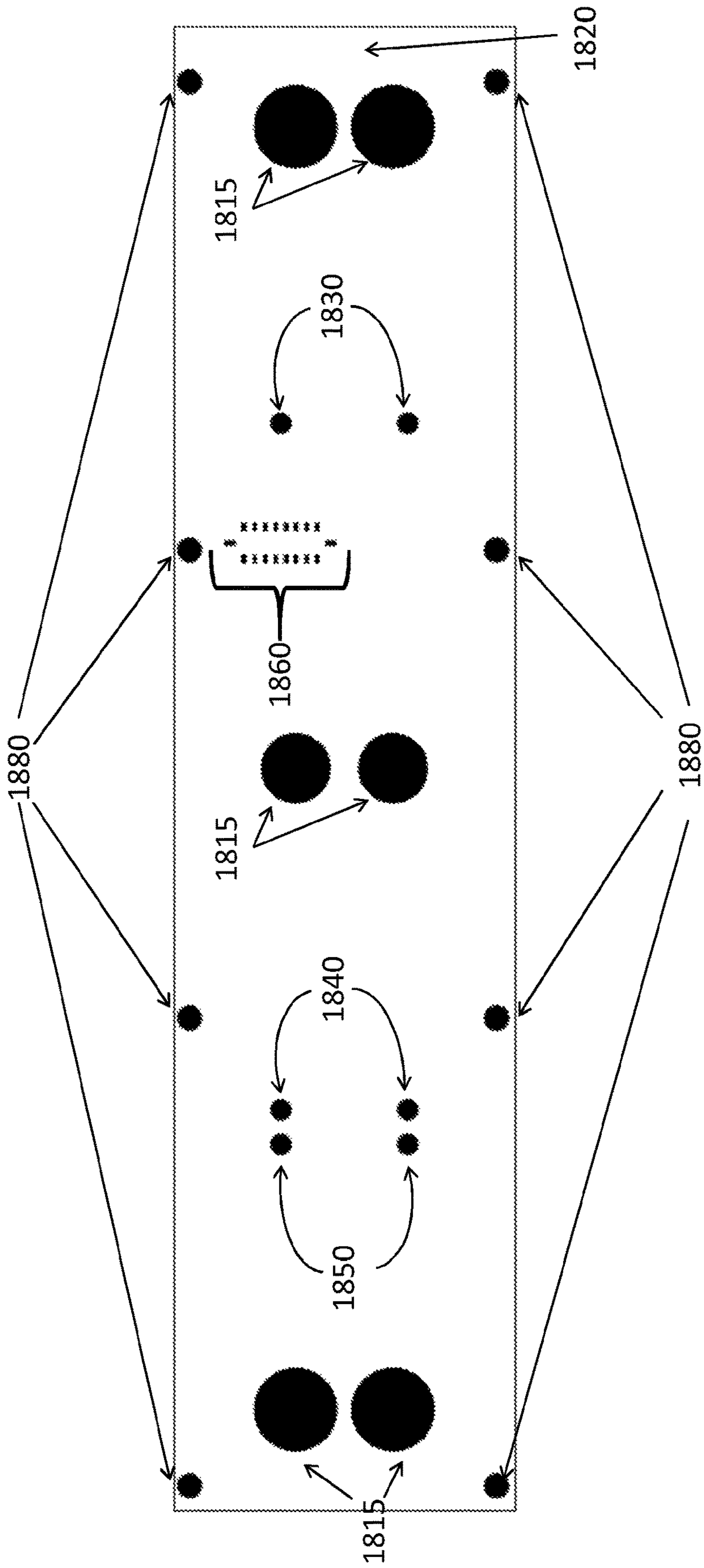
FIG. 18, in a schematic diagram, illustrates an external surface of a lid of a mass spectrometry system in accordance with one aspect of various embodiments of the present disclosure.

FIG. 18 illustrates the external surface layer 1820 of a lid of a mass spectrometry system in accordance with one aspect of various embodiments of the present disclosure. As is disclosed throughout, the external surface is the surface layer that is reasonably accessible to the user for applying electrical and/or mechanical connections from the atmospheric side of the lid. The external surface 1820 includes eight mounting holes 1880. The mounting holes 1880 are configured to receive bolts (not shown), for example, that threadingly engage into a wall of a mass spectrometry vacuum chamber. FIG. 18 shows copper pads 1815, which are included on the external surface 1820. The pads 1815 can provide additional mechanical support to this layer, in particular support for weaker elements positioned nearby and/or on other layers of the lid. The external surface 1820 shows the power input 1830, including RF A/B for a quadrupole rod set for the first ion guide. The external surface 1820 also shows the power input 1840, including RF A/B for a quadrupole rod set for the second ion guide. The external surface 1820 shows the power input 1850, including RF A/B for a quadrupole rod set for the third ion guide. The external surface 1820 shows the DC input 1860 for a lens. In this embodiment, the majority of the surface area, that is, other than the electrical connections, can be formed of an electrically non-conductive material, for example, FR4 or Rogers material.

Figure 19:
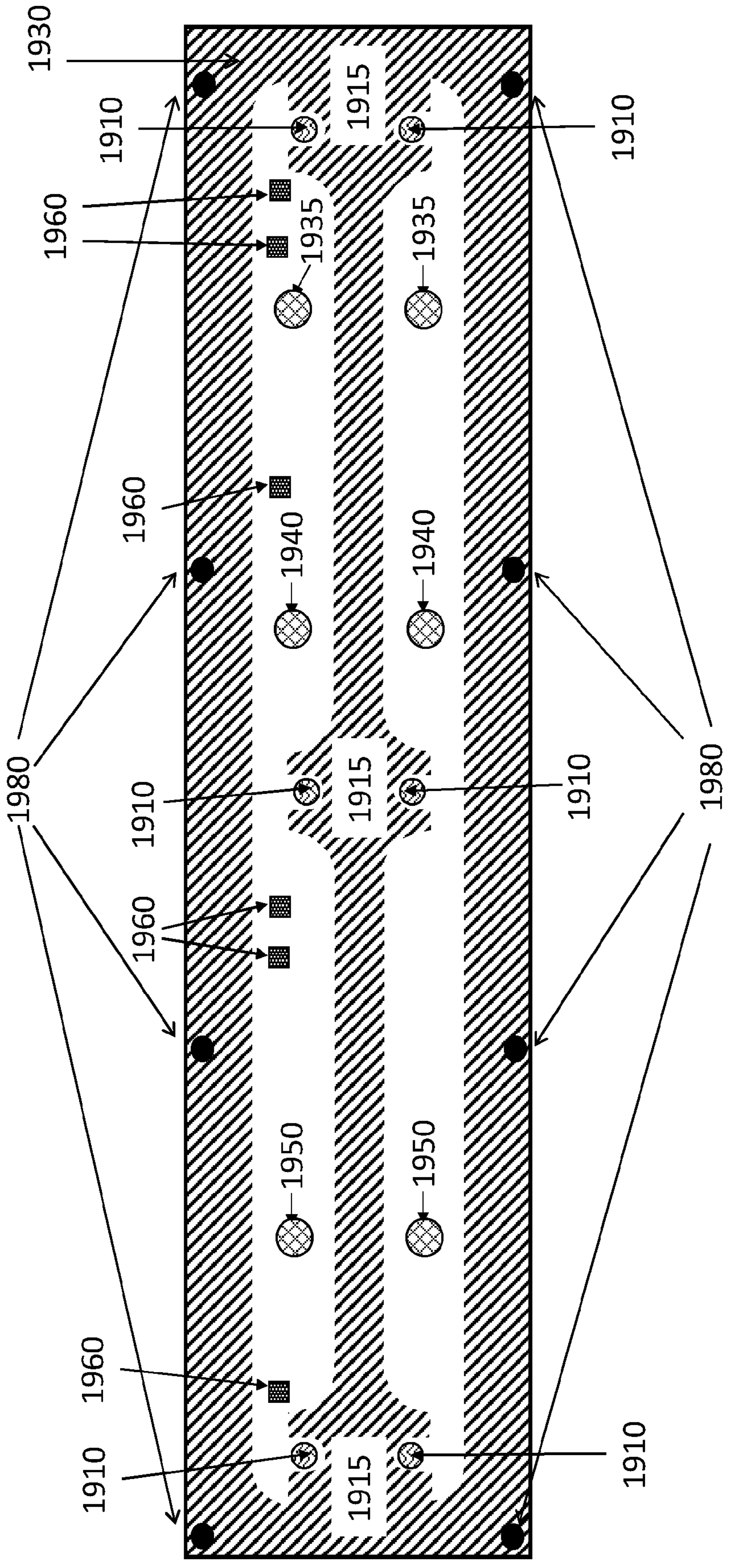
FIG. 19, in a schematic diagram, illustrates a vacuum surface of a lid of a mass spectrometry system in accordance with one aspect of various embodiments of the present disclosure.

FIG. 19 illustrates a vacuum surface layer 1930 of a lid of a mass spectrometry system in accordance with one aspect of various embodiments of the present disclosure. As is disclosed throughout, the vacuum surface is the surface layer that is exposed to the vacuum within the vacuum chamber.

The vacuum surface layer 1930 includes eight mounting holes 1980, which are configured to receive bolts (not shown), for example, that threadingly engage into a surface of a mass spectrometry vacuum chamber. The vacuum surface layer 1930 illustrates contact elements 1910, which in some embodiments, can be useful to provide mechanical or electrical connection to the lid. The vacuum surface layer 1930 illustrates a RF A/B input power connector 1935 for the quadrupole rod set for the first ion guide. The vacuum surface layer 1930 illustrates a RF A/B input power connector 1940 for the quadrupole rod set for the second ion guide. The vacuum surface layer 1930 illustrates a RF A/B input power connector 1950 for the quadrupole rod set for the third ion guide. The vacuum surface layer 1930 illustrates DC input power 1960 for the lens. The vacuum surface layer 1930 illustrates a patterned surface 1915. In this embodiment, the patterned surface 1915 is fabricated, for example from electroless nickel immersion gold, ENIG, plate so that it is configured for vacuum sealing the lid with the mass spectrometry system vacuum chamber using an O-ring down to a pressure of about $1\times10^{-6}$ to about $1\times10^{-8}$ Torr.

Figure 20:
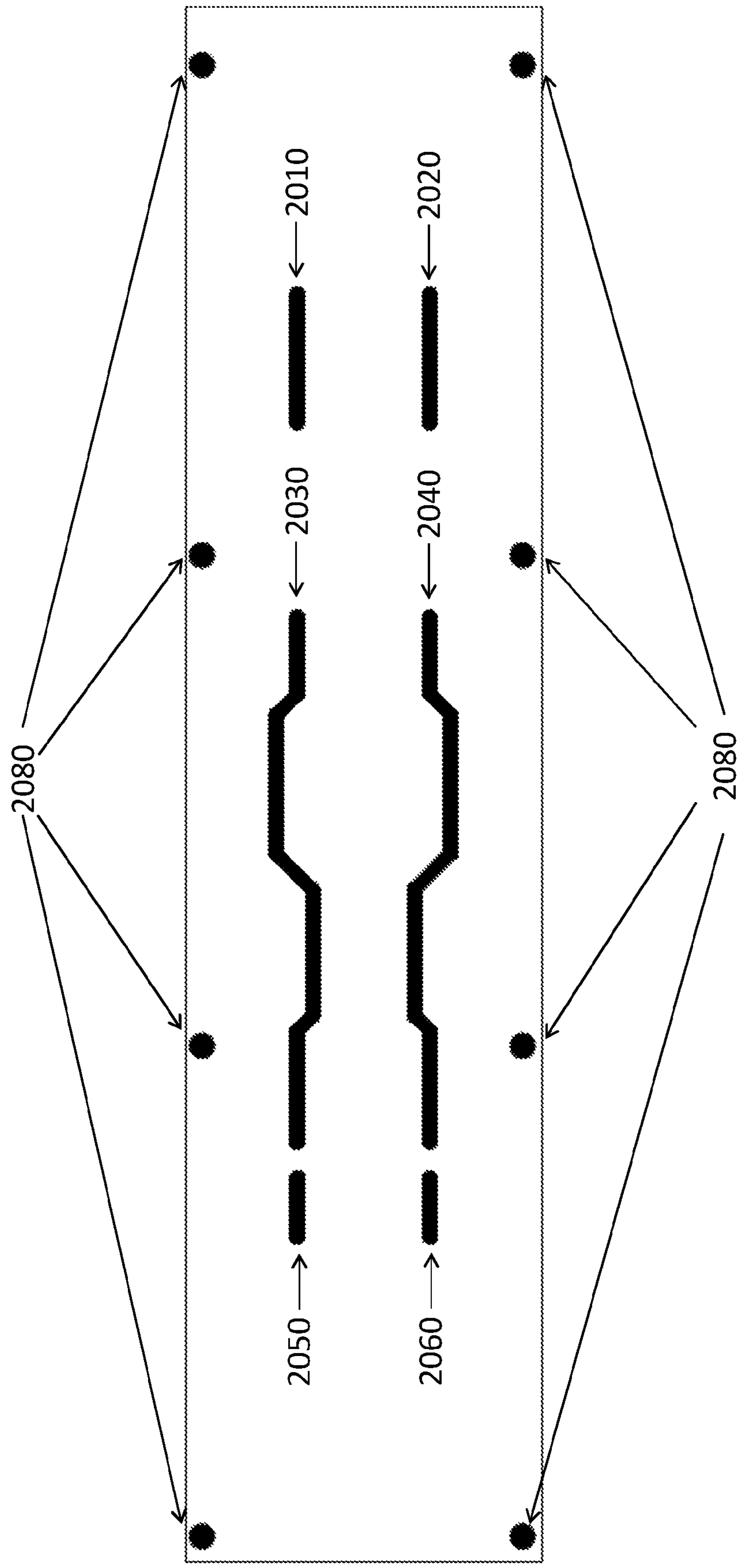
FIG. 20, in a schematic diagram, illustrates an intermediate layer of a lid of a mass spectrometry system in accordance with one aspect of various embodiments of the present disclosure.

FIG. 20 illustrates an intermediate layer of a lid of a mass spectrometry system in accordance with one aspect of various embodiments of the present disclosure. As is disclosed throughout, the intermediate layer has another layer covering each side. In this embodiment, the intermediate layer includes eight mounting holes 2080. The mounting holes 2080 are configured to receive bolts (not shown), for example, that threadingly engage into a mass spectrometry vacuum chamber. The intermediate layer illustrates RF connector 2010 for the RF A for the quadrupole rod set for the first ion guide. The intermediate layer illustrates RF connector 2020 for the RF B for the quadrupole rod set for the first ion guide. The intermediate layer illustrates RF connector 2030 for the RF A for the quadrupole rod set for the second ion guide. The intermediate layer illustrates RF connector 2040 for the RF B for the quadrupole rod set for the second ion guide. The intermediate layer illustrates RF connector 2050 for the RF A for the quadrupole rod set for the third ion guide. The intermediate layer illustrates RF connector 2060 for the RF B for the quadrupole rod set for the third ion guide.

Figure 21:
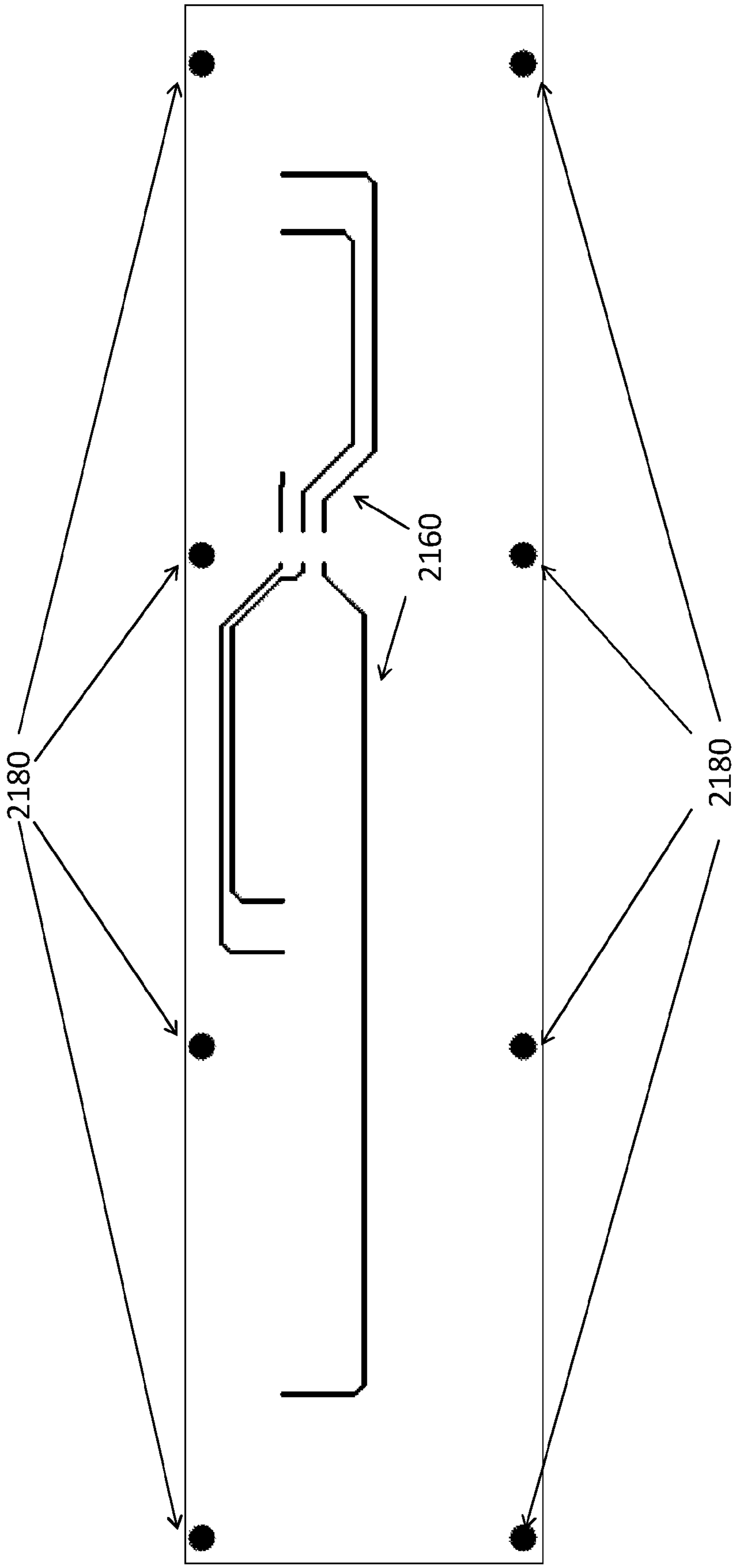
FIG. 21, in a schematic diagram, illustrates a second intermediate layer of a lid of a mass spectrometry system in accordance with one aspect of various embodiments of the present disclosure.

FIG. 21 illustrates a second intermediate layer of a lid of a mass spectrometry system in accordance with one aspect of various embodiments of the present disclosure. As is explained above, the second intermediate layer has another layer covering each side, that is the second intermediate layer is sandwiched between two layers. In this embodiment, the second intermediate layer includes eight mounting holes 2180. The mounting holes 2180 are configured to receive bolts (not shown), for example, that threadingly engage into a mass spectrometry vacuum chamber. The second intermediate layer illustrates DC traces 2160 for the ion lens.

Example 2

The present example is a representation of an ion path mounted to a lid of a mass spectrometry system in accordance with one aspect of various embodiments of the present disclosure.

Figure 22:
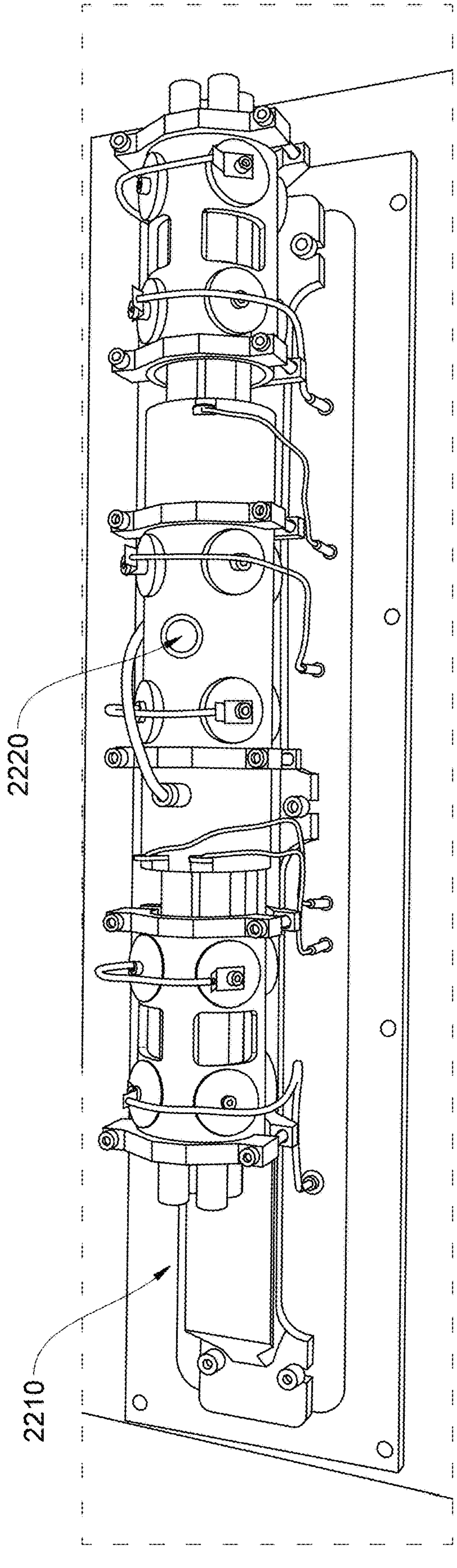
FIG. 22 depicts an exemplary prototype of a lid having a quadrupole ion guide mounted.

FIG. 22 depicts an ion path 2220 mounted to a lid 2210 in accordance with one aspect of various embodiments of the present disclosure.

Example 3

The present example discloses using the lid as a mounting plane in which an ion optics rail mounts directly to the PCB on the vacuum side of the lid and the RF coil boxes mount directly to the PCB on the atmospheric side of the lid.

In this embodiment, a PCB vacuum chamber lid is 6.5 mm thick formed of layers of FR4 material. The separate layers of FR4 include, for example, channels and/or vias, electrically conductive traces, contact elements, as disclosed above, so that the lid is useful to separate the DC and RF voltages from one another as well as provide a vacuum seal by staggering the entry and exit points of the electrical connection as well as a vacuum seal without depending on solder or epoxy to achieve the seal. In this embodiment, the electrically conductive traces are copper. In this embodiment, the contact elements are PEM® nuts embedded into the PCB that are configured to be a mounting point for hardware on the vacuum side of the chamber without compromising the vacuum integrity. The PEM® nuts are threaded with a through hole fastener and/or a threaded electrical connection. Vented screws allow for trapped air in the PCB cavity to be removed for outgassing the vacuum chamber during vacuum operation. The nature of how the PEM® nut is locked into the board and then pressed between layers allows for a very strong mechanical connection point without the need for holes to be drilled through the PCB.

Not wishing to be bound to any specific embodiment, it is noted that the actual design of, for example, lids, layers, high and low voltage traces, elements, traces, channels and/or vias, and/or their materials, properties, characteristics, dimensions, etc., is entirely dependent on the specific application and orientation for which the lid and mass spectrometry system is being used. The board can be very thick, one can take advantage of the insulating properties of PCB-like materials, such as FR4, and route traces, and add components to the board, however desired, while ultimately using the board as the mechanical seal, and structural component for the mounting of the coil boxes and ion optics rail. Thus, the spirit of the present disclosure is creating and constructing a lid for a mass spectrometry.

Those skilled in the art will know or be able to ascertain using no more than routine experimentation, many equivalents to the embodiments and practices described herein. By way of example, the dimensions of the various components and explicit values for particular electrical signals (e.g., amplitude, frequencies, etc.) applied to the various components are merely exemplary and are not intended to limit the scope of the present teachings. Accordingly, it will be understood that the invention is not to be limited to the embodiments disclosed herein, but is to be understood from the following claims, which are to be interpreted as broadly as allowed under the law.

The present disclosure is not limited to the embodiments described and exemplified above but is capable of variation and modification within the scope of the appended claims. The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

Various publications, including patents, published applications, technical articles and scholarly articles are cited throughout the specification. Each of these cited publications is incorporated by reference herein, in its entirety and for all purposes.

OTHER EMBODIMENTS AND EQUIVALENTS

While the present disclosure has explicitly discussed certain particular embodiments and examples of the present disclosure, those skilled in the art will appreciate that the disclosure is not intended to be limited to such embodiments or examples. On the contrary, the present disclosure encompasses various alternatives, modifications, and equivalents of such particular embodiments and/or example, as will be appreciated by those of skill in the art.

Accordingly, for example, methods and diagrams of should not be read as limited to a particular described order or arrangement of steps or elements unless explicitly stated or clearly required from context (e.g., otherwise inoperable). Furthermore, different features of particular elements that may be exemplified in different embodiments may be combined with one another in some embodiments.

What is claimed is:

1. A lid for use in a mass spectrometry system, comprising:

a substrate comprising a plurality of electrically non-conductive layers coupled to one another, the substrate being configured for engaging with an opening of a vacuum chamber of the mass spectrometry system for sealing the chamber from an external environment such that one surface of the substrate is exposed to the vacuum chamber ("vacuum surface") and an opposed surface of the substrate is exposed to the external environment ("external surface"), one or more electrically conductive traces extending between the external surface and the vacuum surface and configured for providing electrical connections between one or more RF and/or DC sources disposed in the external environment and one or more components of the mass spectrometry system disposed within the vacuum chamber, and at least one electrical contact element that is at least partially embedded in one or more of the plurality of layers, the at least one electrical contact element being accessible from the vacuum chamber, wherein the at least one electrical contact element is configured for mechanical mounting of at least one of the one or more components of the mass spectrometer system, and to provide an electrical connection to at least one of the one or more electrically conductive traces, wherein a proximal end of the one or more electrically conductive traces is accessible to the external surface of the substrate and a distal end of each of the one or more electrically conductive traces is accessible to the vacuum surface of the substrate and wherein the proximal and distal ends are laterally displaced relative to one another.

2. The lid of claim 1, wherein the one or more electrically conductive traces comprise at least two electrically conductive traces that are electrically isolated from one another.

3. The lid of claim 1, wherein the electrically conductive traces comprise a metal, wherein the metal is selected from the group consisting of copper, silver, gold, nickel, tin, and carbon ink.

4. The lid of claim 1, wherein at least one of:

the lid is configured to withstand a differential pressure of at least about 1.5 atmospheres when sealingly coupled to the vacuum chamber, the lid is substantially free of leaks and/or outgassing when sealingly coupled to the vacuum chamber, and the lid is configured to remain sealingly engaged with the vacuum chamber for pressures in the vacuum chamber as low as about $1\times10^{-8}$ torr.

5. The lid of claim 1, further comprising a bonding material disposed between at least two of the layers of the substrate, wherein the bonding material comprises prepreg.

6. The lid of claim 1, further comprising a sealing surface for sealingly engaging the lid with the vacuum chamber, wherein the sealing surface comprises one or more of an O-ring disposed in a groove, electroless nickel immersion gold plated copper, and a knife edge.

7. The lid of claim 1, wherein at least one of the one or more electrically conductive traces comprises a unitary conductive structure.

8. The lid of claim 1, further comprising one or more support rails configured for mounting one or more components disposed in the vacuum chamber to the lid, wherein the one or more support rails are coupled to the vacuum surface of the lid.

9. The lid of claim 8, wherein the one or more components comprises an ion lens.

10. The lid of claim 8, wherein the one or more components comprises an RF coil box, wherein the lid further comprises RF components mounted on the RF coil box, and wherein the RF components comprise any of RF chokes, coupling capacitors, and/or resistors.

11. The lid of claim 1, wherein the substrate is a printed circuit board (PCB).

12. The lid of claim 1, further comprising a cavity disposed between at least two of the electrically non-conducting layers to which the at least one electrical contact element is mounted, wherein the cavity is disposed between the at least two of the electrically non-conducting layers such that a cavity at least partially surrounds the cavity and provides venting access to the vacuum chamber.

13. The lid of claim 1, wherein the lid is substantially free of epoxies and solders.

14. The lid of claim 1, further comprising one or more channels and/or vias extending into the layers at the proximal and/or distal ends in which the one or more electrically conductive traces are accessible.

15. The lid of claim 1, further comprising a capacitor, wherein the one or more electrically conductive traces extending between the external surface and the vacuum surface comprises at least two traces separated by the substrate, such that a capacitance exist between the traces, wherein the lid further comprises one or more channels and/or vias extending into the layers at the proximal and/or distal ends in which the one or more electrically conductive traces are accessible.

16. The lid of claim 1, wherein at least one of the electrically non-conductive layers comprises one of Rogers material and FR4 material.

17. The lid of claim 1, wherein the plurality of electrically non-conductive layers comprises at least three layers bonded to one another.

18. The lid of claim 1, wherein the lid has a thickness in a range of about 3 mm to about 9 mm.

19. The lid of claim 1, wherein the lid has a width in a range of about 200 mm to about 400 mm.

* * * * *